(12) United States Patent
Gao et al.

(10) Patent No.: US 12,681,948 B2
(45) Date of Patent: Jul. 14, 2026

(54) DATA WAREHOUSE SYSTEM-BASED DATA PROCESSING METHOD AND DATA WAREHOUSE SYSTEM

(71) Applicant: Huawei Cloud Computing Technologies Co., Ltd., Guizhou (CN)

(72) Inventors: Congli Gao, Beijing (CN); Kai Zeng, Hangzhou (CN); Liang Li, Gui'an (CN); Yanhui Zhong, Chengdu (CN); Wenliang Zhang, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 19/214,631

(22) Filed: May 21, 2025

(65) Prior Publication Data

US 2025/0284705 A1      Sep. 11, 2025

Related U.S. Application Data

(63) Continuation of application No. PCT/CN2023/103906, filed on Jun. 29, 2023.

(30) Foreign Application Priority Data

Nov. 21, 2022    (CN) .......................... 202211462636.9
Dec. 23, 2022    (CN) .......................... 202211667377.3

(51) Int. Cl.
    *G06F 16/25*        (2019.01)
    *G06F 16/22*        (2019.01)
    *G06F 16/28*        (2019.01)
(52) U.S. Cl.
    CPC ........ *G06F 16/254* (2019.01); *G06F 16/2282* (2019.01); *G06F 16/285* (2019.01)

(58) Field of Classification Search
    CPC .. G06F 16/254; G06F 16/2282; G06F 16/285; G06F 16/2455; G06F 16/278;
    (Continued)

(56) References Cited

U.S. PATENT DOCUMENTS 9,489,413 B2 * 11/2016 Raghavan ........... G06F 16/2282
11,243,956 B1 * 2/2022 Papakonstantinou ....................... G06F 16/24565

(Continued)

FOREIGN PATENT DOCUMENTS

CN        103353867 A     10/2013

OTHER PUBLICATIONS

Maddodi S et al: "Data Deduplication Techniques and Analysis," Emerging Trends in Engineering and Technology (ICETET), 2010 3rd International Conference on, IEEE, Nov. 19, 2010, XP031978436, total 5 pages.

(Continued)

*Primary Examiner* — Jared M Bibbee
(74) *Attorney, Agent, or Firm* — Conley Rose, P.C.

(57)        ABSTRACT

A data processing method applied to the data warehouse system includes that a coordinator node allocates a data write request of a data table to a first computing node, and the first computing node checks whether target data corresponding to the data write request meets a constraint condition. If the check succeeds, a metadata cluster checks the target data again. If the check performed by the metadata cluster also succeeds, a cloud storage cluster writes the target data into the data table. It can be learned that the data warehouse system uses a two-layer indexing mechanism and the metadata cluster of a cloud native architecture to check whether data to be written into the data table meets the constraint condition. Therefore, when a data constraint capa- (Continued)

Data warehouse system 100 bility is provided, data reliability is ensured, and that system running performance is not affected is also ensured.

20 Claims, 9 Drawing Sheets

(58) Field of Classification Search
CPC .... G06F 16/283; G06F 16/25; G06F 16/2228; H04L 67/1097; H04L 67/10
See application file for complete search history.

(56) References Cited

U.S. PATENT DOCUMENTS

| | | | | |
|---|---|---|---|---|
| 2017/0293667 A1* | 10/2017 | Denner | ................. | G06F 16/254 |
| 2021/0373761 A1* | 12/2021 | Karr | ...................... | G06F 3/0664 |

OTHER PUBLICATIONS

Anonymous: "Using Partitioning in a Data Warehouse Environment," Mar. 11, 2012, XP093349379, total 11 pages.
Overview of Constraints, Jun. 17, 2025, total 3 pages.
Define primary key and foreign key constraints, Jun. 17, 2025, total 4 pages.
Enforce a Unique constraint on a BigQuery table, Dec. 4, 2020, total 2 pages.
Primary key, foreign key, and unique key using dedicated SQL pool in Azure Synapse Analytics, Feb. 23, 2025, total 4 pages.
Huawei Cloud Stack Information Center, Jun. 17, 2025, total 16 pages.

* cited by examiner

DATA WAREHOUSE SYSTEM-BASED DATA PROCESSING METHOD AND DATA WAREHOUSE SYSTEM

CROSS-REFERENCE TO RELATED APPLICATIONS

This is a continuation of International Patent Application No. PCT/CN2023/103906 filed on Jun. 29, 2023, which claims priority to Chinese Patent Application No. 202211462636.9 filed on Nov. 21, 2022 and Chinese Patent Application No. 202211667377.3 filed on Dec. 23, 2022. All of the aforementioned patent applications are hereby incorporated by reference in their entireties.

TECHNICAL FIELD

This disclosure relates to the field of data warehouse technologies, and in particular, to a data warehouse system-based data processing method and a data warehouse system.

BACKGROUND

With the rapid development of cloud computing and big data, a cloud architecture that supports cloud native becomes a new trend of development of data warehouse systems. However, these data warehouse systems usually do not support an enforcement constraint capability for data. For example, when data imported into a data warehouse system may need to meet a unique constraint, the data warehouse system does not forcibly implement the unique constraint, but a user ensures that the data is unique. For example, before importing the data into the data warehouse system, the user runs a large amount of application code in an extraction-transform-load (ETL) phase to deduplicate the data; or after importing the data into the data warehouse system, the user runs a large amount of application code to deduplicate the data. This method is usually subject to a complex procedure and low efficiency, and may need to consume a large quantity of computing resources. For another example, the user independently ensures that the data imported into the data warehouse system does not violate the unique constraint. This method is highly likely to be interfered with by a human factor, resulting in low data reliability.

Therefore, a data warehouse system that can provide a data constraint capability and a data processing method thereof are urgently needed.

SUMMARY

Embodiments of this disclosure provide a data warehouse system-based data processing method and a data warehouse system, to ensure data reliability while providing a data constraint capability. The technical solutions are as follows.

According to a first aspect, a data warehouse system-based data processing method is provided, and is applied to a data warehouse system. The data warehouse system includes a coordinator node, a metadata cluster, a cloud computing cluster, and a cloud storage cluster. The method includes:

The coordinator node allocates, in response to a data write request of a data table, the data write request to a first computing node in the cloud computing cluster based on a field value of a partition field in target data to be written into the data table, where the first computing node is configured to process data in a partition to which the target data belongs in the data table; the first computing node checks, in response to the data write request based on a local index of the first computing node, whether a field value of a constraint field in the target data meets a constraint condition corresponding to the constraint field, where the local index includes a field value of a constraint field in data corresponding to a data write request previously received by the first computing node, and sends a check request for the target data to the metadata cluster if the check performed by the first computing node on the target data succeeds; the metadata cluster checks, in response to the check request based on a global index of the metadata cluster, whether the field value of the constraint field in the target data meets the constraint condition, where the global index includes a field value of a constraint field in data corresponding to a data write request previously received by the cloud computing cluster; and the cloud storage cluster writes the target data into the data table if both the check performed by the first computing node and the metadata cluster on the target data succeeds.

In the method, the coordinator node allocates the data write request of the data table to the first computing node in the cloud computing cluster, and the first computing node checks whether the target data corresponding to the data write request meets the constraint condition. If the check succeeds, the metadata cluster checks the target data again. If the check performed by the metadata cluster also succeeds, the cloud storage cluster writes the target data into the data table. It can be learned that the data warehouse system uses a two-layer indexing mechanism and the metadata cluster of a cloud native architecture to check whether data to be written into the data table meets the constraint condition. Therefore, when a data constraint capability is provided, data reliability is ensured, and that system running performance is not affected is also ensured.

In some embodiments, the constraint condition is any one of the following: a unique constraint, a primary key constraint, and a foreign key constraint.

In some embodiments, the constraint condition is the unique constraint.

That the first computing node checks, in response to the data write request based on a local index of the first computing node, whether a field value of a constraint field in the target data meets a constraint condition corresponding to the constraint field includes:

The first computing node queries the local index in response to the data write request based on the field value of the constraint field in the target data, where the check on the target data succeeds if a field value that is the same as the field value of the constraint field in the target data does not exist in the local index.

That the metadata cluster checks, in response to the check request based on a global index of the metadata cluster, whether the field value of the constraint field in the target data meets the constraint condition includes:

The metadata cluster queries the global index in response to the check request based on the field value of the constraint field in the target data, where the check on the target data succeeds if a field value that is the same as the field value of the constraint field in the target data does not exist in the global index.

In some embodiments, the constraint condition is the primary key constraint.

That the first computing node checks, in response to the data write request based on a local index of the first computing node, whether a field value of a constraint field in the target data meets a constraint condition corresponding to the constraint field includes:

The first computing node queries the local index in response to the data write request based on the field value of the constraint field in the target data, where the check on the target data succeeds if a field value that is the same as the field value of the constraint field in the target data does not exist in the local index, and the field value of the constraint field in the target data is not null.

That the metadata cluster checks, in response to the check request based on a global index of the metadata cluster, whether the field value of the constraint field in the target data meets the constraint condition includes:

The metadata cluster queries the global index in response to the check request based on the field value of the constraint field in the target data, where the check on the target data succeeds if a field value that is the same as the field value of the constraint field in the target data does not exist in the global index, and the field value of the constraint field in the target data is not null.

In some embodiments, the constraint condition is the foreign key constraint.

That the first computing node checks, in response to the data write request based on a local index of the first computing node, whether a field value of a constraint field in the target data meets a constraint condition corresponding to the constraint field includes:

The first computing node queries the local index in response to the data write request based on the field value of the constraint field in the target data, where the check on the target data succeeds if a target field value that is the same as the field value of the constraint field in the target data exists in the local index, and the target field value belongs to an associated data table of the data table.

That the metadata cluster checks, in response to the check request based on a global index of the metadata cluster, whether the field value of the constraint field in the target data meets the constraint condition includes:

The metadata cluster queries the global index in response to the check request based on the field value of the constraint field in the target data, where the check on the target data succeeds if the target field value that is the same as the field value of the constraint field in the target data exists in the global index, and the target field value belongs to an associated data table of the data table.

According to the data processing method under the foregoing several constraint conditions, the data warehouse system provided in this embodiment of this disclosure can implement a unique constraint capability, a primary key constraint capability, and a foreign key constraint capability for data, so that the data warehouse system has wide applicability.

In some embodiments, the global index is divided into a plurality of sub global indexes based on the field value of the constraint field, the sub global indexes are respectively stored on metadata nodes in the metadata cluster, and field values of constraint fields in the sub global indexes are different from each other.

That the metadata cluster checks, in response to the check request based on a global index of the metadata cluster, whether the field value of the constraint field in the target data meets the constraint condition includes:

Each metadata node checks, in response to the check request based on a sub global index corresponding to the metadata node, whether the field value of the constraint field in the target data meets the constraint condition.

In some embodiments, the method further includes: The metadata cluster returns a check success notification message to the first computing node if the check performed by the metadata cluster on the target data succeeds; and the first computing node sends the target data to the cloud storage cluster based on the notification message, to enable the cloud storage cluster to write the target data into the data table.

According to the foregoing method, the data warehouse system implements real-time check on the target data to be written into the data table. A two-layer indexing mechanism and the metadata cluster of a cloud native architecture are used to check, in real time, whether data to be written into the data table meets the constraint condition. Therefore, when a data constraint capability is provided, data reliability is ensured, and that system running performance is not affected is also ensured.

In some embodiments, the sending a check request for the target data to the metadata cluster if the check performed by the first computing node on the target data succeeds includes: sending the target data to the cloud storage cluster if the check performed by the first computing node on the target data succeeds, to enable the cloud storage cluster to write the target data into the data table; and sending a check request for a plurality of pieces of data to the metadata cluster if a quantity of the plurality of pieces of data sent by the first computing node to the cloud storage cluster reaches a target threshold, where the plurality of pieces of data include the target data.

In some embodiments, that the metadata cluster checks, in response to the check request based on a global index of the metadata cluster, whether the field value of the constraint field in the target data meets the constraint condition includes: The metadata cluster obtains the plurality of pieces of data from the cloud storage cluster in response to the check request for the plurality of pieces of data; the metadata cluster adds field values of constraint fields in the plurality of pieces of data to the global index; and the metadata cluster checks, based on a global index obtained through addition, whether the plurality of pieces of data meet the constraint condition.

According to the foregoing method, the data warehouse system implements asynchronous delayed check on the target data to be written into the data table, thereby greatly reducing communication overheads consumed by the check and improving check efficiency.

In some embodiments, that the metadata cluster checks, in response to the check request based on a global index of the metadata cluster, whether the field value of the constraint field in the target data meets the constraint condition includes: A first metadata node in the metadata cluster obtains at least one piece of first data and the target data from the cloud storage cluster in response to the check request for the plurality of pieces of data based on the field values of the constraint fields in the plurality of pieces of data; the first metadata node adds a field value of a constraint field in the at least one piece of first data and the field value of the constraint field in the target data to a sub global index corresponding to the first metadata node; and the first metadata node checks, based on a sub global index obtained through addition, whether the field value of the constraint field in the target data meets the constraint condition.

According to the foregoing method, each metadata node in the metadata cluster redistributes the obtained plurality of pieces of data based on the constraint field, obtains a corresponding index through construction, and performs check, thereby greatly reducing communication overheads consumed by the check, and improving check efficiency.

In some embodiments, the method further includes: marking the target data in the cloud storage cluster as to-be-cleaned data if the check performed by the metadata cluster on the target data fails.

In some embodiments, the sending the target data to the cloud storage cluster if the check performed by the first computing node on the target data succeeds, to enable the cloud storage cluster to write the target data into the data table includes: sending the target data to the cloud storage cluster if the check performed by the first computing node on the target data succeeds, to enable the cloud storage cluster to compress the plurality of pieces of data including the target data into a compression unit and write the compression unit into the data table.

The sending a check request for a plurality of pieces of data to the metadata cluster if a quantity of the plurality of pieces of data sent by the first computing node to the cloud storage cluster reaches a target threshold includes: sending the check request for the plurality of pieces of data to the metadata cluster based on an identifier of the compression unit if the quantity of the plurality of pieces of data sent by the first computing node to the cloud storage cluster reaches the target threshold.

In some embodiments, the partition field and the constraint field are different fields.

According to a second aspect, a data warehouse system is provided. The data warehouse system includes a coordinator node, a metadata cluster, a cloud computing cluster, and a cloud storage cluster.

The coordinator node is configured to allocate, in response to a data write request of a data table, the data write request to a first computing node in the cloud computing cluster based on a field value of a partition field in target data to be written into the data table, where the first computing node is configured to process data in a partition to which the target data belongs in the data table.

The first computing node is configured to: check, in response to the data write request based on a local index of the first computing node, whether a field value of a constraint field in the target data meets a constraint condition corresponding to the constraint field, where the local index includes a field value of a constraint field in data corresponding to a data write request previously received by the first computing node, and send a check request for the target data to the metadata cluster if the check performed by the first computing node on the target data succeeds.

The metadata cluster is configured to check, in response to the check request based on a global index of the metadata cluster, whether the field value of the constraint field in the target data meets the constraint condition, where the global index includes a field value of a constraint field in data corresponding to a data write request previously received by the cloud computing cluster.

The cloud storage cluster is configured to write the target data into the data table if both the check performed by the first computing node and the metadata cluster on the target data succeeds.

In some embodiments, the constraint condition is any one of the following: a unique constraint, a primary key constraint, and a foreign key constraint.

In some embodiments, the constraint condition is the unique constraint.

The first computing node is configured to query the local index in response to the data write request based on the field value of the constraint field in the target data, where the check on the target data succeeds if a field value that is the same as the field value of the constraint field in the target data does not exist in the local index.

The metadata cluster is configured to query the global index in response to the check request based on the field value of the constraint field in the target data, where the check on the target data succeeds if a field value that is the same as the field value of the constraint field in the target data does not exist in the global index.

In some embodiments, the constraint condition is the primary key constraint.

The first computing node is configured to query the local index in response to the data write request based on the field value of the constraint field in the target data, where the check on the target data succeeds if a field value that is the same as the field value of the constraint field in the target data does not exist in the local index, and the field value of the constraint field in the target data is not null.

The metadata cluster is configured to query the global index in response to the check request based on the field value of the constraint field in the target data, where the check on the target data succeeds if a field value that is the same as the field value of the constraint field in the target data does not exist in the global index, and the field value of the constraint field in the target data is not null.

In some embodiments, the constraint condition is the foreign key constraint.

The first computing node is configured to query the local index in response to the data write request based on the field value of the constraint field in the target data, where the check on the target data succeeds if a target field value that is the same as the field value of the constraint field in the target data exists in the local index, and the target field value belongs to an associated data table of the data table.

The metadata cluster is configured to query the global index in response to the check request based on the field value of the constraint field in the target data, where the check on the target data succeeds if the target field value that is the same as the field value of the constraint field in the target data exists in the global index, and the target field value belongs to the associated data table of the data table.

In some embodiments, the global index is divided into a plurality of sub global indexes based on the field value of the constraint field, the sub global indexes are respectively stored on metadata nodes in the metadata cluster, and field values of constraint fields in the sub global indexes are different from each other.

The metadata cluster is configured to check, in response to the check request based on a sub global index corresponding to each metadata node, whether the field value of the constraint field in the target data meets the constraint condition.

In some embodiments, the metadata cluster is further configured to return a check success notification message to the first computing node if the check performed by the metadata cluster on the target data succeeds. The first computing node is further configured to send the target data to the cloud storage cluster based on the notification message, to enable the cloud storage cluster to write the target data into the data table.

In some embodiments, the first computing node is configured to: send the target data to the cloud storage cluster if the check performed by the first computing node on the target data succeeds, to enable the cloud storage cluster to write the target data into the data table; and send a check request for a plurality of pieces of data to the metadata cluster if a quantity of the plurality of pieces of data sent by the first computing node to the cloud storage cluster reaches a target threshold, where the plurality of pieces of data include the target data.

In some embodiments, the metadata cluster is configured to: obtain the plurality of pieces of data from the cloud storage cluster in response to the check request for the plurality of pieces of data; add field values of constraint fields in the plurality of pieces of data to the global index; and check, based on a global index obtained through addition, whether the plurality of pieces of data meet the constraint condition.

In some embodiments, a first metadata node in the metadata cluster is configured to: obtain at least one piece of first data and the target data from the cloud storage cluster in response to the check request for the plurality of pieces of data based on the field values of the constraint fields in the plurality of pieces of data; add a field value of a constraint field in the at least one piece of first data and the field value of the constraint field in the target data to a sub global index corresponding to the first metadata node; and check, based on a sub global index obtained through addition, whether the field value of the constraint field in the target data meets the constraint condition.

In some embodiments, the metadata cluster is further configured to mark the target data in the cloud storage cluster as to-be-cleaned data if the check performed by the metadata cluster on the target data fails.

In some embodiments, the first computing node is configured to: send the target data to the cloud storage cluster if the check performed by the first computing node on the target data succeeds, to enable the cloud storage cluster to compress the plurality of pieces of data including the target data into a compression unit and write the compression unit into the data table; and send the check request for the plurality of pieces of data to the metadata cluster based on an identifier of the compression unit if the quantity of the plurality of pieces of data sent by the first computing node to the cloud storage cluster reaches the target threshold.

In some embodiments, the partition field and the constraint field are different fields.

According to a third aspect, an embodiment of this disclosure provides a cloud computing apparatus, configured in a data warehouse system. The data warehouse system includes a coordinator node, a metadata cluster, a cloud computing cluster, and a cloud storage cluster.

The apparatus includes at least one functional module, configured to perform the steps performed by the cloud computing cluster in the data warehouse system-based data processing method provided in any one of the first aspect or the possible implementations of the first aspect.

According to a fourth aspect, an embodiment of this disclosure provides a metadata apparatus, configured in a data warehouse system. The data warehouse system includes a coordinator node, a metadata cluster, a cloud computing cluster, and a cloud storage cluster.

The apparatus includes at least one functional module, configured to perform the steps performed by the metadata cluster in the data warehouse system-based data processing method provided in any one of the first aspect or the possible implementations of the first aspect.

According to a fifth aspect, an embodiment of this disclosure provides a computing device cluster, including at least one computing device. Each computing device includes a processor and a memory. A processor of the at least one computing device is configured to execute instructions stored in a memory of the at least one computing device, to enable the computing device cluster to perform the data warehouse system-based data processing method provided in any one of the first aspect or the possible implementations of the first aspect.

According to a sixth aspect, an embodiment of this disclosure provides a computer program product including instructions. When the instructions are run by a computing device cluster, the computing device cluster is enabled to perform the data warehouse system-based data processing method provided in any one of the first aspect or the possible implementations of the first aspect. The computer program product may be a software installation package. When a function of the foregoing computing device cluster may need to be implemented, the computer program product may be downloaded and executed on the computing device cluster.

According to a seventh aspect, an embodiment of this disclosure provides a computer-readable storage medium, including computer program instructions. When the computer program instructions are executed by a computing device cluster, the computing device cluster performs the data warehouse system-based data processing method provided in any one of the first aspect or the possible implementations of the first aspect. The storage medium includes but is not limited to a volatile memory, for example, a random-access memory (RAM), or a non-volatile memory, for example, a flash memory, a hard disk drive (HDD), or a solid-state drive (SSD).

DESCRIPTION OF EMBODIMENTS

Figure 1:
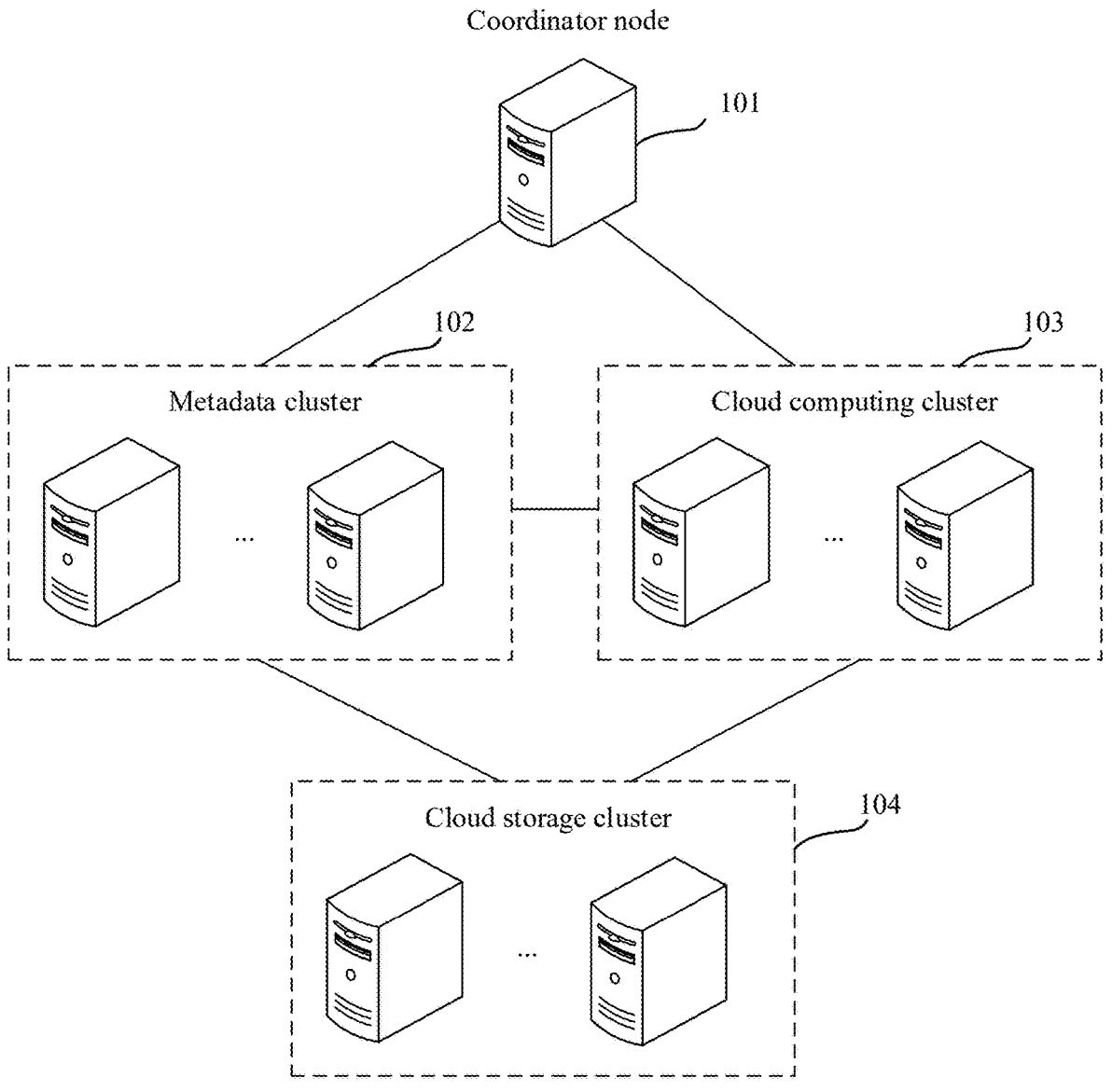
FIG. 1 is a diagram of a data warehouse system according to an embodiment of this disclosure.

To make objectives, technical solutions, and advantages of this disclosure clearer, the following further describes implementations of this disclosure in detail with reference to the accompanying drawings.

It should be noted that information (including but not limited to user equipment information, personal information of a user, and the like), data (including but not limited to data used for analysis, stored data, displayed data, and the like), and signals in this disclosure are used under authorization by the user or full authorization by all parties, and collection, use, and processing of related data may need to conform to related laws, regulations, and standards of related countries and regions. For example, target data in this disclosure is obtained under full authorization.

The following first describes key terms and key concepts in this disclosure.

Cloud native is a compound word, where cloud indicates that an application is located in the cloud instead of a data center, and native indicates that an application is designed based on a cloud environment, is natively designed for the cloud, and runs on the cloud in the best posture, making full use of the elasticity and "distributed" advantages of a cloud platform.

The cloud platform is short for a cloud computing platform, and provides computing, network, and storage capabilities based on services of a hardware resource and a software resource. The cloud platform uses the network "cloud" to remotely process and analyze massive data computing and return processed and analyzed data to a user. The cloud platform has features such as a large scale, "distributed", virtualization, high availability, scalability, an on-demand service, and security. The cloud platform can implement rapid provisioning and release of a configurable computing resource at low management costs or with low complexity of interaction between the user and a service provider.

A data warehouse system is a data system used to store, analyze, and report data. A purpose of the data warehouse system is to construct an integrated data environment oriented to analysis, and can provide decision support for an enterprise.

An object storage service (OBS) is an object-based massive storage service, and provides the user with massive, secure, and highly-reliable data storage capabilities, including bucket creation, bucket modification, bucket deletion, object upload, object download, object deletion, and the like. In some embodiments, the OBS is used to compress data into a compression unit (which is a minimum unit of column storage), to implement data storage.

A database is an ordered set of structured information or data, and is usually stored in a computer system in an electronic form. The database is generally controlled by a database management system (DBMS). For example, the data, the DBMS, and an associated application are collectively referred to as a database system, which is usually referred to as a database for short.

Field: The data in the database is generally managed in a form of a data table with several rows and several columns. Data in each column is generally data with a same attribute. Data in each column is referred to as a field or an attribute. For example, for a class score data table, a name, a student number, and a score are referred to as fields, and correspondingly, field values of the fields are a specific name, a specific student number, and a specific score.

Constraint conditions in the database: Generally, the database includes five constraint conditions: a unique constraint, a not null constraint, a primary key constraint, a check constraint, and a foreign key constraint. The following describes the several constraint conditions.

(1) Unique constraint: It may need to semantically ensure that some fields in the data table are unique. For example, in a user information management data table, it may need to ensure that a user identity (ID) field is unique (where different users have different IDs). However, a name field may be duplicated. Therefore, the ID field is defined as the unique constraint during data table definition. Based on this, if the unique constraint is defined, when the database inserts data into the data table, the database reports an error if duplication occurs between the inserted data and existing data in the data table.

(2) Not null constraint: Field values of some fields in the data table are not allowed to be "null" values, in other words, the fields values are "not allowed to be null".

(3) Primary key constraint: A maximum of one primary key constraint can be created in one data table to uniquely identify one row of data. The primary key constraint meets both the unique constraint and the not null constraint.

(4) Check constraint: Field values of some fields in the data table meet a specified condition. For example, a field value of a score field is a number ranging from 0 to 100. If data inserted by the user is not in the range, the database reports an error.

(5) Foreign key constraint: The foreign key constraint is also referred to as a referential constraint or a referential integrity constraint, and is used to define association relationships between and within tables. A user information data table and an order information data table are used as an example. The order information data table records an item purchased by the user, a field value of an ID field of the user in the order information data table is a value that appears in an ID field value in the user information data table, and an ID field in the user information data table is a primary key field. In other words, there is an association relationship between a table A and a table B, and a field in the table B is a primary key field in the table A. This constraint is referred to as the foreign key constraint.

The following describes an application scenario and an implementation environment of this disclosure.

It can be learned from the foregoing descriptions of the constraint conditions in the database that, the database usually supports a constraint capability for data. However, in the data warehouse system, because the data warehouse system generally stores data in a column-store manner, an index support capability of the data warehouse system is poor. As a result, the data warehouse system usually does not support the constraint capability for the data (where it should be understood that the constraint capability herein is an enforcement constraint capability, namely, a constraint capability implemented by the data warehouse system). In addition, the data warehouse system generally uses distributed storage, and data in the data warehouse system is divided into a plurality of physical machines according to a specific partitioning strategy. In this case, once the data warehouse system supports the constraint capability for the data, running performance of the data warehouse system is severely affected. The unique constraint is used as an example. If a partition field in a data table is inconsistent with a unique constraint field, and the data warehouse system divides the data into each computing node in a computing cluster based on a field a, but a field b in the data table is a unique constraint field, when performing unique check on the field b, the data warehouse system may need to check data of all nodes in the computing cluster. Consequently, running performance of the data warehouse system is poor.

Based on this, embodiments of this disclosure provide a data warehouse system, to support a constraint capability for data, and ensure that running performance of the data warehouse system is not affected while ensuring data reliability. The following describes the data warehouse system provided in embodiments of this disclosure.

FIG. 1 is a diagram of a data warehouse system according to an embodiment of this disclosure. As shown in FIG. 1, the data warehouse system 100 includes a coordinator node 101, a metadata cluster 102, a cloud computing cluster 103, and a cloud storage cluster 104. The coordinator node 101, the metadata cluster 102, the cloud computing cluster 103, and the cloud storage cluster 104 are directly or indirectly connected through a wired network or a wireless network. This is not limited herein.

The coordinator node 101 is communicatively connected to a terminal, and a client runs on the terminal. The coordinator node 101 is configured to: receive various data processing requests (such as a data write request, a data query request, and a data update request) for a data table that are sent by the client, deliver the requests to the cloud computing cluster 103 for execution, and return an execution result to the client after receiving the execution result fed back by the cloud computing cluster 103.

The metadata cluster 102 includes a plurality of metadata nodes, and is configured to manage metadata, a transaction processing status, and the like of the data warehouse system 100. The metadata is data about data, and is used to support functions such as indicating a storage location, historical data, resource search, and file recording. This is not limited herein. In this embodiment of this disclosure, the metadata cluster 102 is configured to provide a constraint capability for the data in combination with the cloud computing cluster 103. An implementation of this process is described in a subsequent method embodiment, and details are not described herein.

The cloud computing cluster 103 includes a plurality of computing nodes, and is configured to: execute various data processing requests sent by the coordinator node 101, and feed back an execution result to the coordinator node 101. The data write request is used as an example. The cloud computing cluster 103 sends, to the cloud storage cluster 104 in response to the data write request, data corresponding to the data write request, and the cloud storage cluster 104 performs persistent storage on the data, and returns a corresponding execution result to the coordinator node 101 after the data is successfully stored. In addition, in this embodiment of this disclosure, the cloud computing cluster 103 is configured to provide a constraint capability for the data with reference to the metadata cluster 102. An implementation of this process is described in a subsequent method embodiment, and details are not described herein. In addition, a quantity of cloud computing clusters 103 is not limited in this embodiment of this disclosure. There may be more or fewer cloud computing clusters 103, for example, a cloud computing cluster 1, a cloud computing cluster 2, and the like.

The cloud storage cluster 104 includes a plurality of storage nodes, and is configured to provide a data storage service for the data warehouse system 100. For example, the cloud storage cluster 104 is configured to provide an OBS, and the cloud storage cluster 104 is configured to compress the received data into a compression unit, to implement data storage. This is not limited in this embodiment of this disclosure.

In some embodiments, for any node in the foregoing data warehouse system 100, the node is a device that has both a computing capability and a storage capability, for example, a server or a desktop computer. For example, the node may be an independent physical server, a server cluster or a distributed system including a plurality of physical servers, or a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. The cloud computing cluster 103 is used as an example. The cloud computing cluster 103 is also referred to as a cloud platform. The cloud computing cluster 103 may be implemented based on a virtual machine (VM) or a container engine. This is not limited herein.

In some embodiments, the wireless network or the wired network uses a standard communication technology and/or protocol. A network is generally the internet, but may alternatively be any network, including but not limited to any combination of a local area network (LAN), a metropolitan area network (MAN), a wide area network (WAN), a mobile network, a wired network, a wireless network, a private network, or a virtual private network (VPN). In some implementations, technologies and/or formats including a Hypertext Markup Language (HTML), an Extensible Markup Language (XML), and the like are used to represent data exchanged through the network. In addition, all or some links can be encrypted by using other encryption technologies such as a Secure Sockets Layer (SSL), Transport Layer Security (TLS), a VPN, and Internet Protocol Security (IPsec). In some other embodiments, customized and/or dedicated data communication technologies can be further used to replace or supplement the foregoing data communication technologies.

It should be understood that a quantity of nodes in each part of the data warehouse system 100 shown in FIG. 1 is merely an example for description, and there may be more or fewer nodes in each part. This is not limited in this embodiment of this disclosure.

In addition, the foregoing data warehouse system 100 may also be understood as being formed by various apparatuses. For example, the coordinator node may be referred to as a coordinator apparatus. All the apparatuses may be implemented by using software or hardware. For example, the following describes an implementation of an apparatus (referred to as a cloud computing apparatus below) corresponding to the cloud computing cluster 103. Similarly, implementations of other apparatuses are similar.

The apparatus is used as an example of a software functional unit, and the cloud computing apparatus may include code run on a computing instance. The computing instance may include at least one of a physical host (computing device), a VM, and a container. Further, there may be one or more computing instances. For example, the cloud computing apparatus may include code run on a plurality of hosts/virtual machines/containers. It should be noted that, the plurality of hosts/virtual machines/containers configured to run the code may be distributed in a same region, or may be distributed in different regions. Further, the plurality of hosts/virtual machines/containers configured to run the code may be distributed in a same availability zone (AZ), or may be distributed in different AZs. Each AZ includes one data center or a plurality of data centers with similar geographical locations. Generally, one region may include a plurality of AZs.

Similarly, the plurality of hosts/virtual machines/containers configured to run the code may be distributed in a same virtual private cloud (VPC), or may be distributed in a plurality of VPCs. Generally, one VPC is disposed in one region. A communication gateway may need to be disposed in each VPC for communication between two VPCs in a same region or cross-region communication between VPCs in different regions. Interconnection between VPCs is implemented through the communication gateway.

The apparatus is used as an example of a hardware functional unit, and the cloud computing apparatus may include at least one computing device, for example, a server. Alternatively, the cloud computing apparatus may be a device implemented by using an application-specific integrated circuit (ASIC), a device implemented by using a programmable logic device (PLD), or the like. The PLD may be implemented by using a complex programmable logic device (CPLD), a field-programmable gate array (FPGA), generic array logic (GAL), or any combination thereof.

The plurality of computing devices included in the cloud computing apparatus may be distributed in a same region, or may be distributed in different regions. The plurality of computing devices included in the cloud computing apparatus may be distributed in a same AZ, or may be distributed in different AZs. Similarly, the plurality of computing devices included in the cloud computing apparatus may be distributed in a same VPC, or may be distributed in a plurality of VPCs. The plurality of computing devices may be any combination of computing devices such as the server, the ASIC, the PLD, the CPLD, the FPGA, and the GAL.

The following describes a hardware structure of the node in the foregoing data warehouse system.

Figure 2:
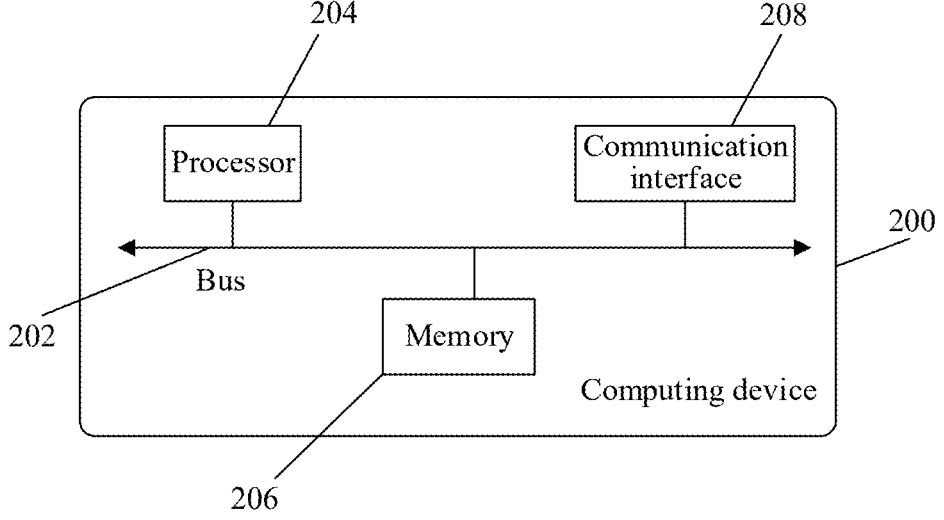
FIG. 2 is a diagram of a hardware structure of a computing device according to an embodiment of this disclosure.

Embodiments of this disclosure provide a computing device, which can be configured as any node in the foregoing data warehouse system, for example, a coordinator node, a metadata node in a metadata cluster, a computing node in a cloud computing cluster, and a storage node in a cloud storage cluster. FIG. 2 is a diagram of a hardware structure of a computing device according to an embodiment of this disclosure. As shown in FIG. 2. The computing device 200 includes a bus 202, a processor 204, a memory 206, and a communication interface 208. The processor 204, the memory 206, and the communication interface 208 communicate with each other through the bus 202. It should be understood that quantities of processors and memories in the computing device 200 are not limited in this disclosure.

The bus 202 may be a Peripheral Component Interconnect (PCI) bus, an Extended Industry Standard Architecture (EISA) bus, or the like. Buses may be classified into an address bus, a data bus, a control bus, and the like. For ease of representation, only one line is used to represent the bus in FIG. 2, but this does not mean that there is only one bus or one type of bus. The bus 202 may include a path for transmitting information between components (for example, the memory 206, the processor 204, and the communication interface 208) in the computing device 200.

The processor 204 may include any one or more of processors such as a central processing unit (CPU), a graphics processing unit (GPU), a microprocessor (MP), or a digital signal processor (DSP).

The memory 206 may include a volatile memory, for example, a RAM. The processor 204 may further include a non-volatile memory, for example, a read-only memory (ROM), a flash memory, an HDD, or an SSD.

The memory 206 stores executable program code. For example, the computing device 200 is configured as the coordinator node 101, and the processor 204 executes the executable program code to implement a function of the coordinator node 101. For example, the computing device 200 is configured as the metadata node in the metadata cluster 102. The processor 204 executes the executable program code to implement a function of the metadata node. It should be understood that, the same applies to the cloud computing cluster 103 and the cloud storage cluster 104, and therefore details are not described herein.

The communication interface 208 uses a transceiver module, for example, but not limited to, a network interface card or a transceiver, to implement communication between the computing device 200 and another device or a communication network.

Embodiments of this disclosure further provide a computing device cluster. The computing device cluster includes at least one computing device.

Figure 3:
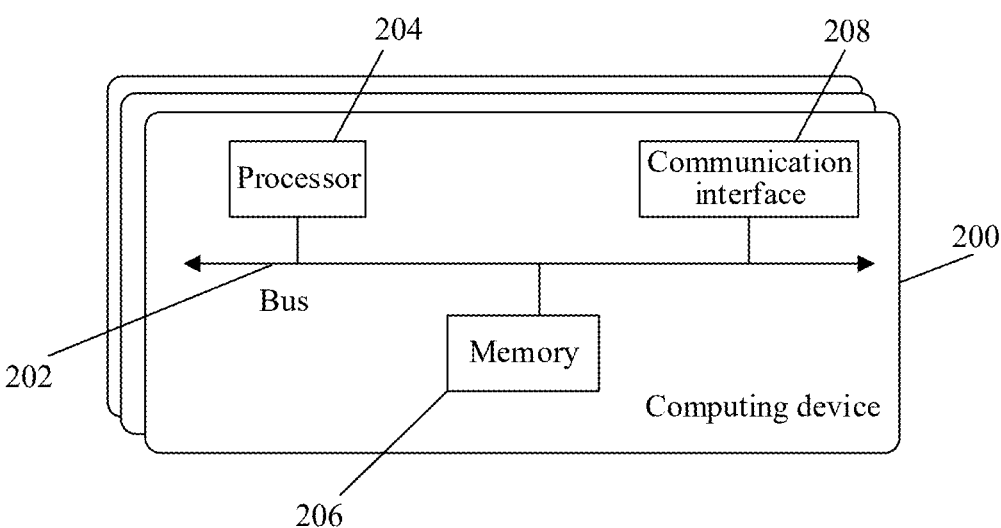
FIG. 3 is a diagram of a structure of a computing device cluster according to an embodiment of this disclosure.

FIG. 3 is a diagram of a structure of a computing device cluster according to an embodiment of this disclosure. As shown in FIG. 3, the computing device cluster includes at least one computing device 200. A memory 206 in one or more computing devices 200 in the computing device cluster may store a same instruction used to perform the following data warehouse system-based data processing method.

In some possible implementations, the memory 206 in the one or more computing devices 200 in the computing device cluster may alternatively separately store some instructions used to perform the following data warehouse system-based data processing method. In other words, a combination of the one or more computing devices 200 may jointly execute instructions used to perform the following data warehouse system-based data processing method.

It should be noted that memories 206 in different computing devices 200 in the computing device cluster may store different instructions, which are respectively used to perform functions of parts in the data warehouse system 100. The instructions stored in the memories 206 in the different computing devices 200 may implement functions of one or more parts of the coordinator node 101, the metadata cluster 102, the cloud computing cluster 103, and the cloud storage cluster 104.

Figure 4:
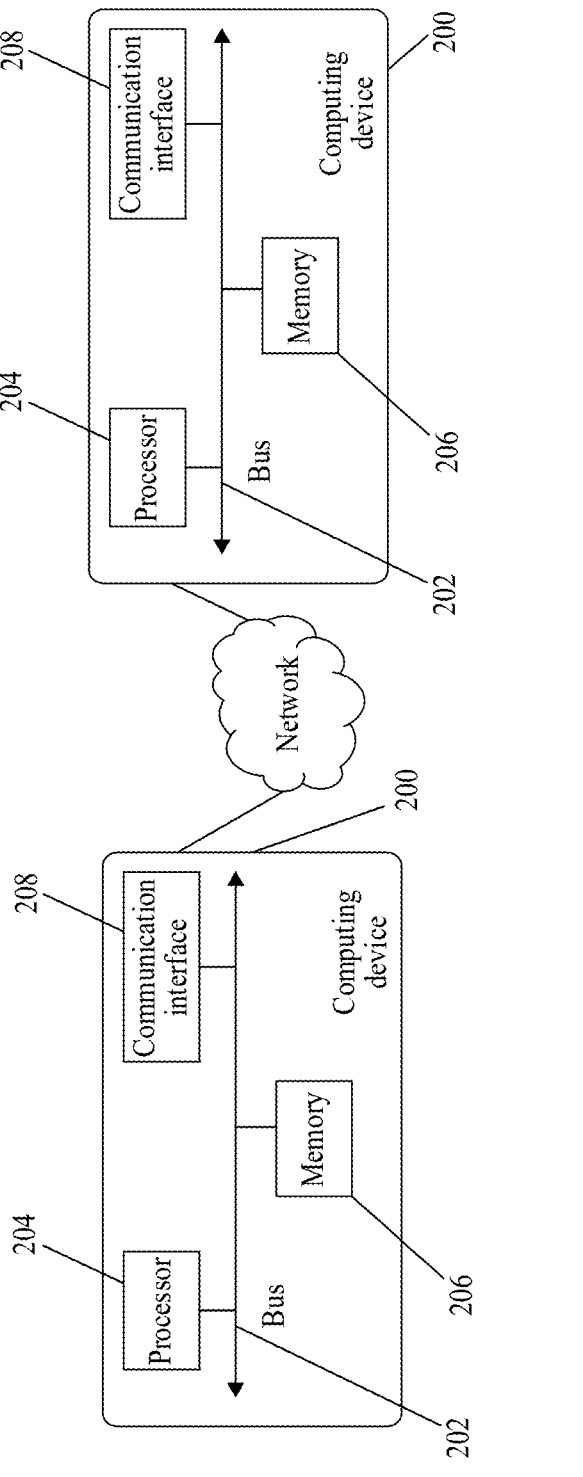
FIG. 4 is a diagram of a connection manner in a computing device cluster according to an embodiment of this disclosure.

In some embodiments, the one or more computing devices in the computing device cluster may be connected through a network. The network may be a WAN, a LAN, or the like. FIG. 4 is a diagram of a connection manner in a computing device cluster according to an embodiment of this disclosure. As shown in FIG. 4, two computing devices 200 are connected through a network. Each computing device is connected to the network through a communication interface in the computing device. In this possible implementation, in the connection manner in the computing device cluster shown in FIG. 4, considering that a data warehouse system 100 provided in this disclosure relates to different parts, memories in different computing devices store instructions for performing functions of the different parts. For example, a memory 206 in one computing device 200 stores an instruction for performing a function of a coordinator node 101. A memory 206 in the other computing device 200 stores an instruction for performing a function of a metadata cluster 102. It should be understood that a function of the computing device 200 shown in FIG. 4 may alternatively be completed by a plurality of computing devices 200.

The following describes, by using several method embodiments, a data warehouse system-based data processing method provided in this disclosure.

Embodiments of this disclosure provide a data processing method for a data warehouse system. A coordinator node allocates, in response to a data write request of a data table, the data write request to a first computing node in a cloud computing cluster, and the first computing node checks whether target data corresponding to the data write request meets a constraint condition. If the check succeeds, a metadata cluster checks the target data again. If the check performed by the metadata cluster also succeeds, a cloud storage cluster writes the target data into the data table. In the foregoing process, if the check performed by the first computing node succeeds, a processing manner of the data warehouse system includes the following two cases.

Case 1: If the check performed by the first computing node succeeds, the metadata cluster first performs check again, and if the check performed by the metadata cluster succeeds, the cloud storage cluster writes the target data into the data table (where this process may also be understood as real-time check).

Case 2: If the check performed by the first computing node succeeds, the cloud storage cluster first writes the target data into the data table, and then the metadata cluster performs check again. If the check performed by the metadata cluster fails, the target data in the cloud storage cluster is deleted (where this process may also be understood as asynchronous delayed check).

Figure 5:
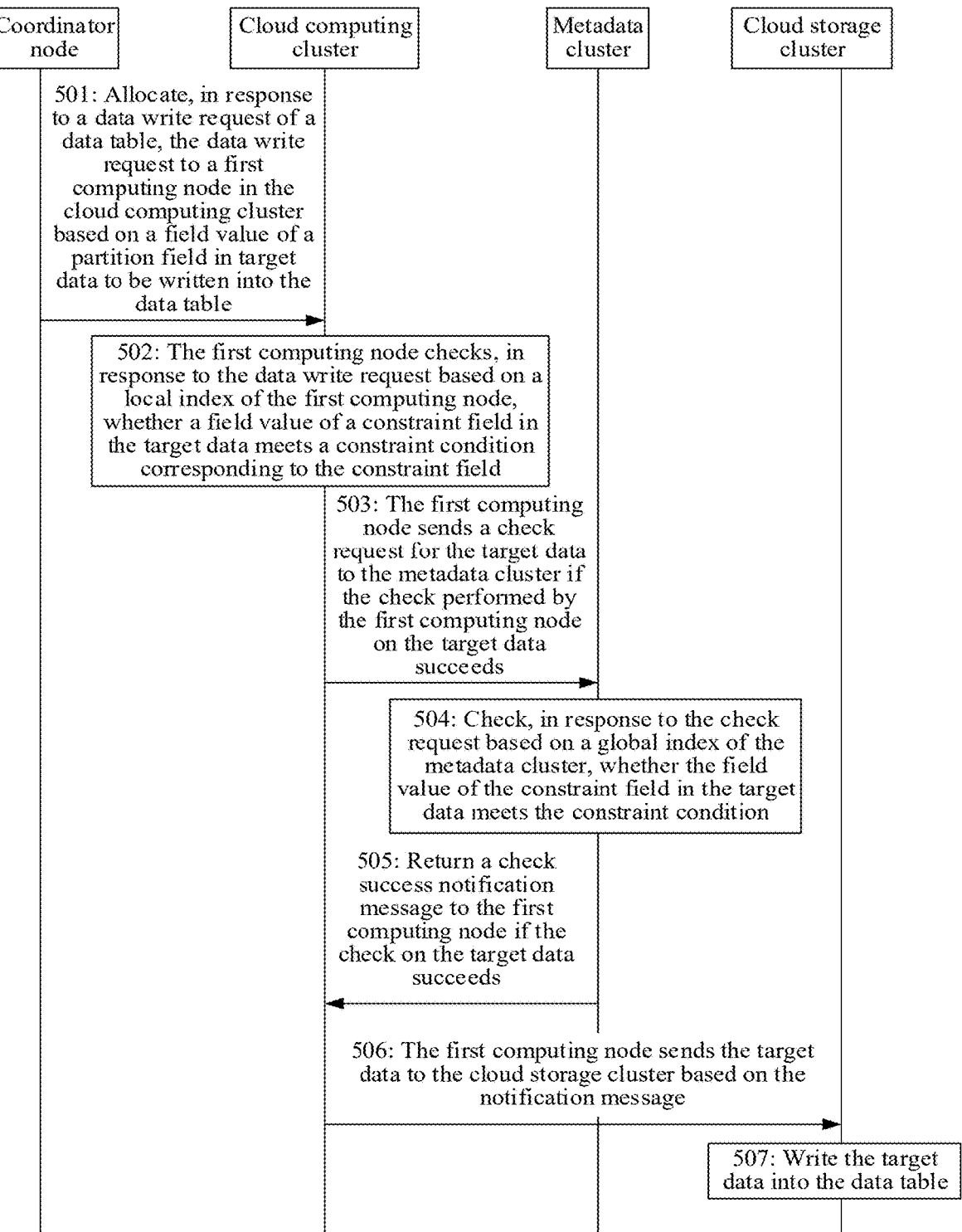
FIG. 5 is a flowchart of a data warehouse system-based data processing method according to an embodiment of this disclosure.
Figure 7:
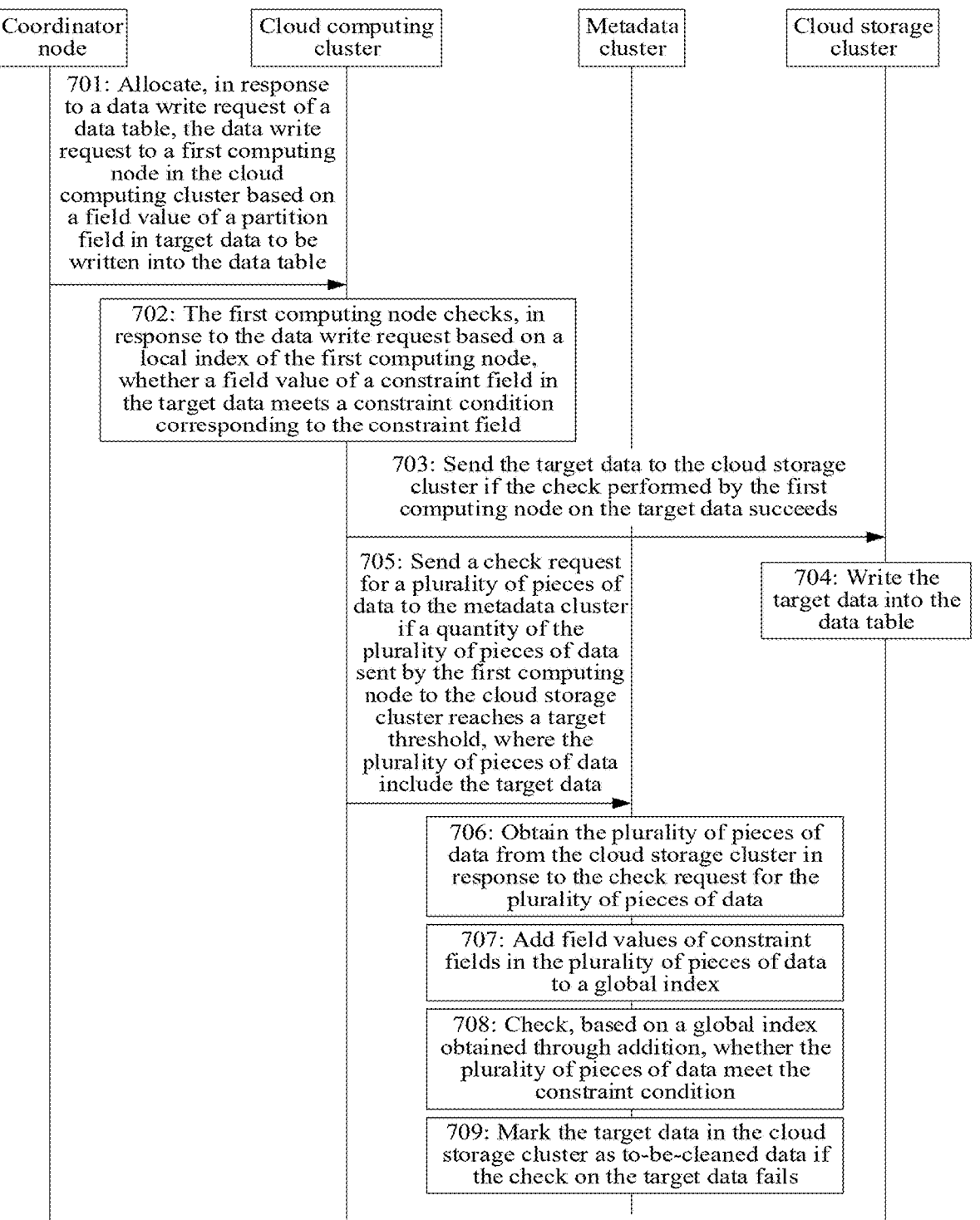
FIG. 7 is a flowchart of another data warehouse system-based data processing method according to an embodiment of this disclosure.

The following respectively describes the foregoing two cases by using embodiments shown in FIG. 5 and FIG. 7.

FIG. 5 is a flowchart of a data warehouse system-based data processing method according to an embodiment of this disclosure. As shown in FIG. 5, the method is applied to the data warehouse system shown in FIG. 1. Interaction between parts in the data warehouse system is used as an example for description. The method includes the following step 501 to step 507.

501: A coordinator node allocates, in response to a data write request of a data table, the data write request to a first computing node in a cloud computing cluster based on a field value of a partition field in target data to be written into the data table, where the first computing node is configured to process data in a partition to which the target data belongs in the data table.

The coordinator node is communicatively connected to a terminal, and a client runs on the terminal. The terminal sends the data write request of the data table to the coordinator node in response to a data write operation that is for the data table and that is performed by a user by using the client, where the data write request includes the target data to be written into the data table. In addition, the data table may be any data table. A type and content of data stored in the data table are not limited in this embodiment of this disclosure.

In this embodiment of this disclosure, the data warehouse system performs partition processing on the data table based on the partition field, and evenly allocates the data in the data table to different computing nodes in the cloud computing cluster. In other words, each computing node in the cloud computing cluster is configured to process data in each partition of the data table. For example, the coordinator node determines, in response to the data write request of the data table based on the field value of the partition field in the target data, the partition to which the target data belongs in the data table, and allocates the data write request to the first computing node corresponding to the partition to which the target data belongs. It should be noted that a data partition in this disclosure may be a hash partition, a range partition, a list partition, or the like. This is not limited herein. The hash partition is used as an example. The coordinator node invokes a hash function in response to the data write request, calculates a hash value of the field value of the partition field in the target data, and determines, based on the hash value, the partition to which the target data belongs, to determine the first computing node. This is not limited in this embodiment of this disclosure.

502: The first computing node checks, in response to the data write request based on a local index of the first computing node, whether a field value of a constraint field in the target data meets a constraint condition corresponding to the constraint field, where the local index includes a field value of a constraint field in data corresponding to a data write request previously received by the first computing node.

The constraint condition corresponding to the constraint field includes any one of the following: a unique constraint, a primary key constraint, and a foreign key constraint. In this embodiment of this disclosure, each computing node in the cloud computing cluster stores a local index of the computing node, so that when a data write request is received, whether data corresponding to the data write request meets the constraint condition is checked based on the local index of each computing node.

The following uses different constraint conditions as an example to describe a process in which the first computing node checks the target data based on the local index. The following three check manners are included.

First, unique constraint:

The first computing node queries the local index in response to the data write request based on the field value of the constraint field in the target data, where the check on the target data succeeds if a field value that is the same as the field value of the constraint field in the target data does not exist in the local index. It should be understood that, based on the foregoing descriptions of the unique constraint, it can be learned that the unique constraint means that data to be inserted into the data table may not duplicate with existing data in the data table, in other words, the field value of the constraint field is unique in the data table. For example, the constraint field is a field a. The local index of the first computing node includes field values a1, a2, and a3 of previously received fields a. If a field value of a field a in the target data is a1, the unique constraint is violated, and the check on the target data fails; or if a field value of a field a in the target data is a4, the unique constraint is met, and the check on the target data succeeds.

Second, primary key constraint:

The first computing node queries the local index in response to the data write request based on the field value of the constraint field in the target data, where the check on the target data succeeds if a field value that is the same as the field value of the constraint field in the target data does not exist in the local index, and the field value of the constraint field in the target data is not null. It should be understood that, based on the foregoing descriptions of the primary key constraint, it can be learned that the primary key constraint meets both the unique constraint and a not null constraint, in other words, the field value of the constraint field is unique in the data table and not null. For example, the constraint field is a field a. The local index of the first computing node includes field values a1, a2, and a3 of previously received fields a. If a field value of a field a in the target data is a4 and a4 is null, the primary key constraint is violated, and the check on the target data fails; or if a field value of a field a in the target data is a4 and a4 is not null, the primary key constraint is met, and the check on the target data succeeds.

Third, foreign key constraint:

The first computing node queries the local index in response to the data write request based on the field value of the constraint field in the target data, where the check on the target data succeeds if a target field value that is the same as the field value of the constraint field in the target data exists in the local index, and the target field value belongs to an associated data table of the data table. It should be understood that, based on the foregoing descriptions of the foreign key constraint, it can be learned that if there is an association relationship between a table A and a table B, and a field in the table B is a primary key field in the table A, the foreign key constraint is met. Therefore, under this constraint, the local index of the first computing node includes a field value that is of a previously received constraint field and that is in the associated data table of the data table. For example, the constraint field is a field a. The local index of the first computing node includes field values a1, a2, and a3 that are of previously received fields a and that are in the association data table. If a field value of a field a in the target data is a1, the check on the target data succeeds; or if a field value of a field a in the target data is a4, the check on the target data fails.

In some embodiments, the first computing node returns a check failure notification message to the coordinator node if the check performed by the first computing node on the target data fails, to enable the coordinator node to return the notification message to the client.

After step 502, when receiving the data write request, the first computing node checks, based on the local index of the first computing node, whether the constraint field of the target data meets the constraint condition. In some embodiments, the partition field and the constraint field of the target data are different fields. As a result, the first computing node cannot learn of a status of data processed by another computing node. Therefore, the first computing node further performs global check on the target data by sending a check request to a metadata cluster, to ensure that the target data meets the constraint condition, and improve data reliability. The following describes this process in step 503 to step 506.

503: The first computing node sends the check request for the target data to the metadata cluster if the check performed by the first computing node on the target data succeeds.

504: The metadata cluster checks, in response to the check request based on a global index of the metadata cluster, whether the field value of the constraint field in the target data meets the constraint condition, where the global index includes a field value of a constraint field in data corresponding to a data write request previously received by the cloud computing cluster.

The metadata cluster includes a plurality of metadata nodes. In some embodiments, a target metadata node stores the global index. Correspondingly, in the foregoing step 503, the first computing node sends the check request to the target metadata node. Certainly, the first computing node may alternatively send the check request to any metadata node in the metadata cluster, the metadata node that receives the check request forwards the check request to the target metadata node, and the metadata node checks, based on the global index, whether the field value of the constraint field in the target data meets the constraint condition. In some other embodiments, the global index is divided into a plurality of sub global indexes based on the field value of the constraint field, the sub global indexes are respectively stored on metadata nodes in the metadata cluster, and field values of constraint fields in the sub global indexes are different from each other. Correspondingly, in the foregoing step 503, the first computing node sends the check request to each metadata node in the metadata cluster, and each metadata node checks, in response to the check request based on a sub global index corresponding to the metadata node, whether the field value of the constraint field in the target data meets the constraint condition.

It can be learned from the foregoing step 502 that, there are three processes in which the first computing node checks the target data based on the local index, and the three processes respectively correspond to three constraint conditions. Correspondingly, in this step, the following three processes in which the metadata cluster checks the target data based on the global index are also included.

First, unique constraint:

The metadata cluster queries the global index in response to the check request based on the field value of the constraint field in the target data, where the check on the target data succeeds if a field value that is the same as the field value of the constraint field in the target data does not exist in the global index. This process is similar to the foregoing step 502, and therefore details are not described again. It should be noted that, an example in which the target metadata node stores the global index is used. The foregoing check process is performed by the target metadata node. An example in which the global index is divided into a plurality of sub global indexes based on the field value of the constraint field is used. The foregoing check process is performed by each metadata node. Details are not described herein again (the same applies to the subsequent second and third processes, and therefore details are not described again subsequently).

Second, primary key constraint:

The metadata cluster queries the global index in response to the check request based on the field value of the constraint field in the target data, where the check on the target data succeeds if a field value that is the same as the field value of the constraint field in the target data does not exist in the global index, and the field value of the constraint field in the target data is not null. This process is similar to the foregoing step 502, and therefore details are not described again.

Third, foreign key constraint:

The metadata cluster queries the global index in response to the check request based on the field value of the constraint field in the target data, where the check on the target data succeeds if the target field value that is the same as the field value of the constraint field in the target data exists in the global index, and the target field value belongs to the associated data table of the data table. This process is similar to the foregoing step 502, and therefore details are not described again.

505: The metadata cluster returns a check success notification message to the first computing node if the check performed by the metadata cluster on the target data succeeds.

An example in which the target metadata node stores the global index is used. In this step, the target metadata node returns the check success notification message to the first computing node. An example in which the global index is divided into a plurality of sub global indexes based on the field value of the constraint field is used. In this step, each metadata node returns the check success notification message to the first computing node.

In some embodiments, the metadata cluster returns a check failure notification message to the coordinator node if the check performed by the metadata cluster on the target data fails, to enable the coordinator node to return the notification message to the client.

After step 503 to step 505, the first computing node sends the check request to the metadata cluster, and the metadata cluster further performs global check on the target data, and returns the check success notification message to the first computing node when the check succeeds. Therefore, it is ensured that the target data meets the constraint condition, and data reliability is improved.

506: The first computing node sends the target data to the cloud storage cluster based on the notification message.

507: The cloud storage cluster writes the target data into the data table.

The cloud storage cluster is configured to provide a data storage service for the data warehouse system. In some embodiments, the cloud storage cluster is configured to provide an OBS. For example, the cloud storage cluster compresses the received target data into a compression unit, and writes the compression unit into the data table.

Figure 6:
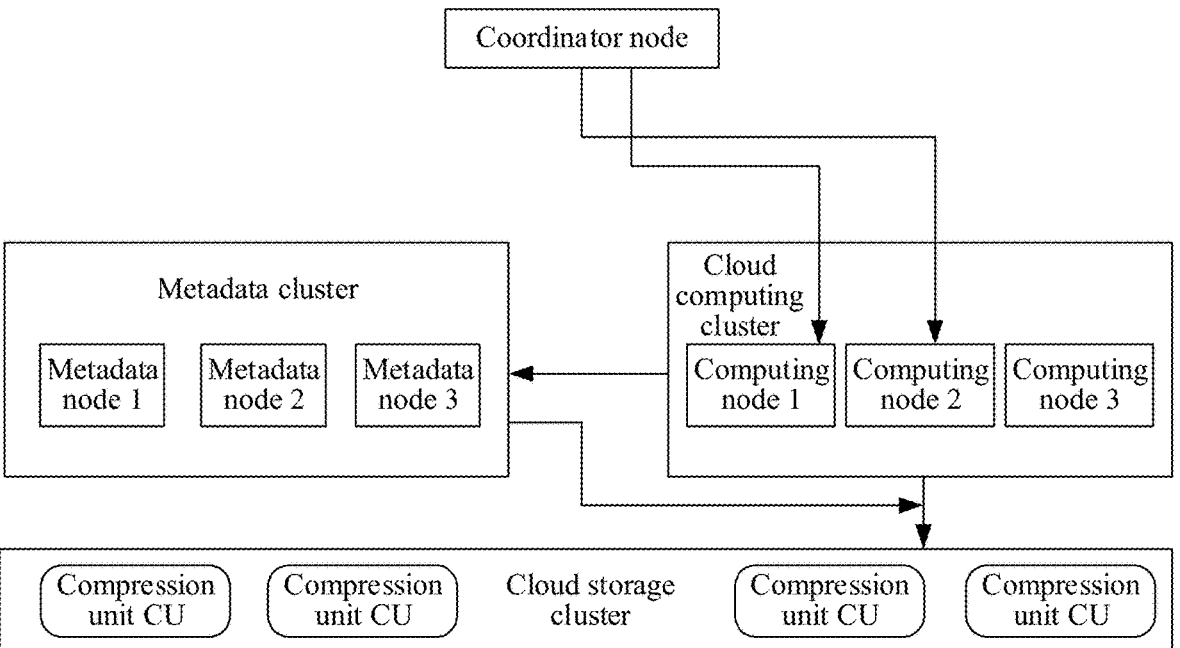
FIG. 6 is a diagram of a data processing method according to an embodiment of this disclosure.

According to the data processing method shown in step 501 to step 507, the data warehouse system implements real-time check on the target data to be written into the data table. This method is applicable to a scenario in which a small batch of data is imported in a streaming manner. For example, FIG. 6 is a diagram of a data processing method according to an embodiment of this disclosure. As shown in FIG. 6, a coordinator node allocates, in response to a data write request (namely, an insert statement) of a data table, the data write request to a first computing node (for example, a computing node 1 or a computing node 2) in a cloud computing cluster. The first computing node checks, in response to the data write request based on a local index, whether a field value of a constraint field in target data meets a constraint condition, and directly reports an error to the coordinator node if the check fails; or sends a check request to a metadata cluster if the check succeeds. The metadata cluster checks, again based on a global index, whether the field value of the constraint field in the target data meets the constraint condition, and notifies, if the check succeeds, the first computing node to import the target data into a compression unit of a cloud storage cluster; or reports an error to the coordinator node if the check fails.

In conclusion, in the data warehouse system-based data processing method provided in this embodiment of this disclosure, the coordinator node allocates the data write request of the data table to the first computing node in the cloud computing cluster, and the first computing node checks whether the target data corresponding to the data write request meets the constraint condition. If the check succeeds, the metadata cluster checks the target data again. If the check performed by the metadata cluster also succeeds, the cloud storage cluster writes the target data into the data table. It can be learned that the data warehouse system uses a two-layer indexing mechanism and the metadata cluster of a cloud native architecture to check whether data to be written into the data table meets the constraint condition. Therefore, when a data constraint capability is provided, data reliability is ensured, and that system running performance is not affected is also ensured.

FIG. 7 is a flowchart of another data warehouse system-based data processing method according to an embodiment of this disclosure. As shown in FIG. 7, the method is applied to the data warehouse system shown in FIG. 1. Interaction between parts in the data warehouse system is used as an example for description. The method includes the following step 701 to step 709.

701: A coordinator node allocates, in response to a data write request of a data table, the data write request to a first computing node in a cloud computing cluster based on a field value of a partition field in target data to be written into the data table, where the first computing node is configured to process data in a partition to which the target data belongs in the data table.

This step is similar to the foregoing step 501, and therefore details are not described again.

702: The first computing node checks, in response to the data write request based on a local index of the first computing node, whether a field value of a constraint field in the target data meets a constraint condition corresponding to the constraint field, where the local index includes a field value of a constraint field in data corresponding to a data write request previously received by the first computing node.

This step is similar to the foregoing step 502, and therefore details are not described again.

703: The first computing node sends the target data to a cloud storage cluster if the check performed by the first computing node on the target data succeeds.

The first computing node first sends the target data to the cloud storage cluster if the check performed by the first computing node on the target data succeeds, and the cloud storage cluster writes the target data into the data table. In some embodiments, the first computing node determines an amount of data corresponding to the received data write request, and sends a plurality of pieces of data to the cloud storage cluster if an amount of the received plurality of pieces of data including the target data reaches a target threshold, and the cloud storage cluster writes the plurality of pieces of data into the data table. The target threshold is a preset threshold, and can be set based on an actual application. For example, the target threshold is 60,000 rows. This is not limited herein.

704: The cloud storage cluster writes the target data into the data table.

This step is similar to the foregoing step 507, and therefore details are not described again. In some embodiments, an example in which the cloud storage cluster is configured to provide an OBS is used. If the cloud storage cluster receives the plurality of pieces of data including the target data, the cloud storage cluster compresses the plurality pieces of data into a compression unit, and writes the compression unit into the data table. For example, the cloud storage cluster sends an identifier of the compression unit to the first computing node, so that the first computing node performs check again by using a metadata cluster.

705: The first computing node sends a check request for the plurality of pieces of data to the metadata cluster if the quantity of the plurality of pieces of data sent by the first computing node to the cloud storage cluster reaches the target threshold, where the plurality of pieces of data include the target data.

The first computing node determines the quantity of the plurality of pieces of data sent to the cloud storage cluster, and sends the check request for the plurality of pieces of data to the metadata cluster if the quantity of the plurality of pieces of data reaches the target threshold. In some embodiments, an example in which the cloud storage cluster is configured to provide an OBS is used. The cloud storage cluster compresses the plurality of pieces of data into the compression unit. Correspondingly, the first computing node sends the check request for the plurality of pieces of data to the metadata cluster based on the identifier of the compression unit if the quantity of the plurality of pieces of data sent by the first computing node to the cloud storage cluster reaches the target threshold. In other words, the check request carries the identifier of the compression unit.

706: The metadata cluster obtains the plurality of pieces of data from the cloud storage cluster in response to the check request for the plurality of pieces of data.

707: The metadata cluster adds field values of constraint fields in the plurality of pieces of data to a global index.

708: The metadata cluster checks, based on a global index obtained through addition, whether the plurality of pieces of data meet the constraint condition.

In step 706 to step 708, it should be understood that the metadata cluster includes a plurality of metadata nodes. Based on a process similar to the foregoing step 504, in some embodiments, the global index is stored by a target metadata node. In this case, the target metadata node obtains the plurality of pieces of data from the cloud storage cluster in response to the check request sent by the first computing node, adds the field values of the constraint fields in the plurality of pieces of data to the global index, and checks, based on the global index obtained through addition, whether each piece of data meets the constraint condition. For example, the check request carries the identifier of the compression unit. The target metadata node obtains the plurality of pieces of data from the cloud storage cluster based on the identifier of the compression unit. This is not limited in this embodiment of this disclosure.

In some other embodiments, the global index is divided into a plurality of sub global indexes based on the field value of the constraint field, the sub global indexes are respectively stored on metadata nodes in the metadata cluster, and field values of constraint fields in the sub global indexes are different from each other. In this case, each metadata node in the metadata cluster obtains the plurality of pieces of data from the cloud storage cluster in response to the check request, adds a field value of a constraint field in the obtained data to a sub global index corresponding to the metadata node (where this process is a process of performing redistribution based on the constraint field to obtain a corresponding index through construction), and checks whether a field value of a constraint field in each piece of data meets the constraint condition. The following uses a first metadata node that obtains the target data as an example to describe this process. The following several steps are included.

Step 1: The first metadata node obtains at least one piece of first data and the target data from the cloud storage cluster in response to the check request for the plurality of pieces of data based on the field values of the constraint fields in the plurality of pieces of data.

The first metadata node obtains the plurality of pieces of data from the cloud storage cluster in response to the check request, invokes a hash function, calculates a hash value of the field value of the constraint field in each piece of data, and determines, based on the hash value, at least one piece of first data and the target data that the first metadata node really may need to obtain. It should be understood that, because hash values calculated by invoking the hash function for a same field value are the same, if field values of constraint fields in any two pieces of data in the plurality of pieces of data are the same, the two pieces of data are obtained by a same metadata node, to provide technical support for a data warehouse system to implement single metadata node check, and further improve check efficiency.

Step 2: The first metadata node adds a field value of a constraint field in the at least one piece of first data and the field value of the constraint field in the target data to a sub global index corresponding to the first metadata node.

Step 3: The first metadata node checks, based on a sub global index obtained through addition, whether the field value of the constraint field in the target data meets the constraint condition.

The first metadata node checks, based on the sub global index obtained through addition, whether a field value of a constraint field in each piece of first data and the field value of the constraint field in the target data meet the constraint condition. This process is similar to both the foregoing step 502 and step 504, and therefore details are not described again.

According to the process shown in step 1 to step 3, each metadata node in the metadata cluster redistributes the obtained plurality of pieces of data based on the constraint field, to obtain a corresponding sub global index through construction, and performs check, so that data check work is offloaded from a scale of the cloud computing cluster to a single node of the metadata cluster for check. This greatly reduces a workload of data check, greatly reduces communication overheads consumed by the check, and improves check efficiency.

709: The metadata cluster marks the target data in the cloud storage cluster as to-be-cleaned data if the check performed by the metadata cluster on the target data fails.

The target data is used as an example. The metadata cluster marks the target data in the cloud storage cluster as the to-be-cleaned data if the check performed by the metadata cluster on the target data fails. For example, the metadata cluster stores a delete bitmap of physical metadata, and marks the target data in the cloud storage cluster as the to-be-cleaned data by marking the delete bitmap. It should be noted that an occasion for deleting the to-be-cleaned data by the cloud storage cluster is not limited in this embodiment of this disclosure. The cloud storage cluster may execute a deletion task based on the delete bitmap at an interval of a preset time period, or may execute the deletion task in real time based on an update status of the delete bitmap.

In some embodiments, an example in which the constraint condition is a unique constraint or a primary key constraint is used. If the check performed by the metadata cluster on the target data fails, the metadata cluster determines third data from the target data and at least one piece of second data according to a target rule, and marks data other than the third data in the target data and the at least one piece of second data as the to-be-cleaned data, where a field value of a constraint field in the second data is the same as the field value of the constraint field in the target data. The target rule may be set based on an actual application. For example, the target rule indicates that data with a smallest data write timestamp is successfully inserted. For example, the metadata cluster compares a timestamp of the target data with a timestamp of each piece of second data, determines data with a smallest timestamp as data that is successfully inserted, marks remaining data as the to-be-cleaned data, and returns a processing result to the coordinator node, so that the coordinator node feeds back the processing result to a client.

Figure 8:
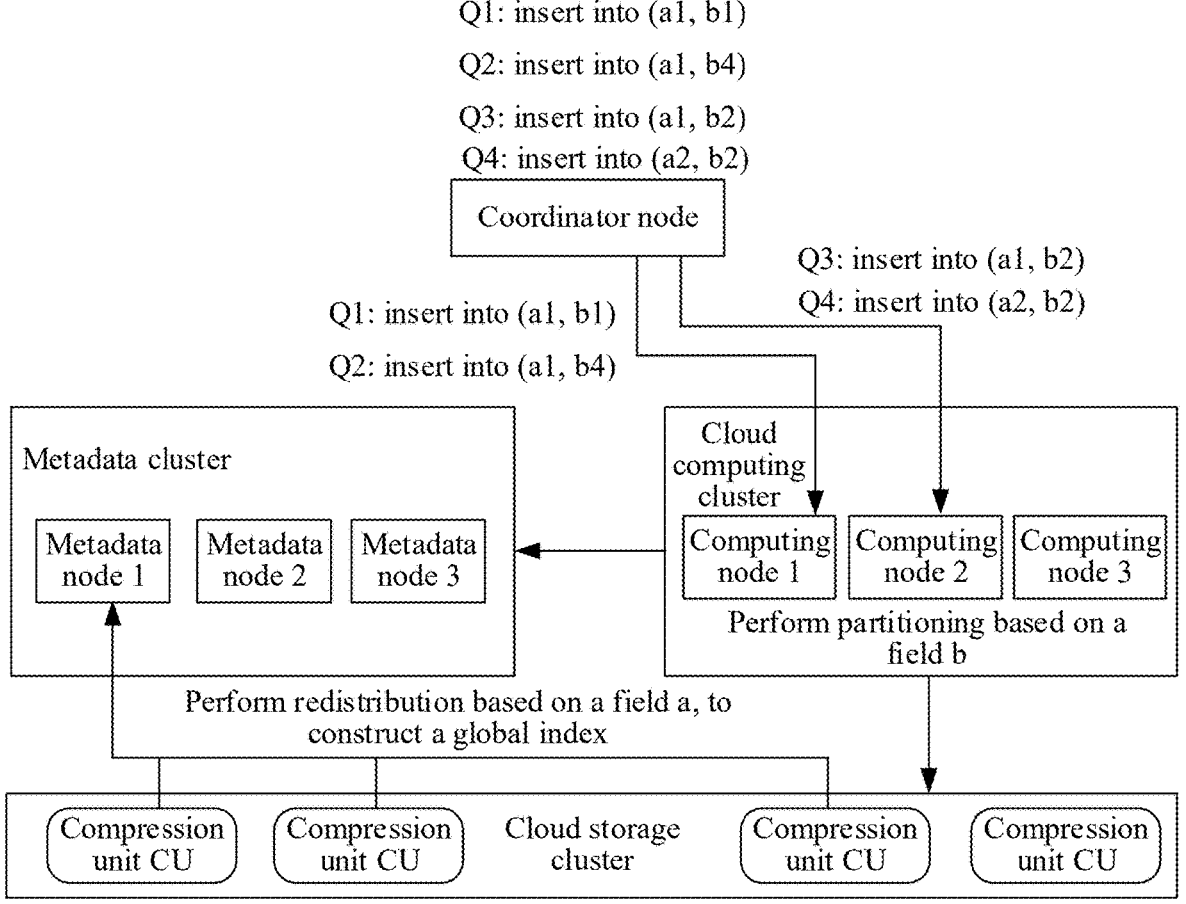
FIG. 8 is a diagram of another data processing method according to an embodiment of this disclosure.

According to the data processing method shown in step 701 to step 709, the data warehouse system implements asynchronous delayed check on the target data to be written into the data table. This method is applicable to a scenario in which a large batch of data is imported. For example, FIG. 8 is a diagram of another data processing method according to an embodiment of this disclosure. As shown in FIG. 8, an example in which a data warehouse system performs partition processing on a data table based on a field b, a constraint condition is a primary key constraint, and a field a is a constraint field is used for description. For example, a coordinator node receives a plurality of data write requests of the data table, which are respectively Q1: insert into (a1, b1), Q2: insert into (a1, b4), Q3: insert into (a1, b2), and Q4: insert into (a2, b2). The coordinator node allocates each data write request to each computing node in a cloud computing cluster based on a field b in each piece of data, and allocates Q1 and Q2 to a computing node 1, and allocates Q3 and Q4 to a computing node 2. For the computing node 1, the computing node 1 executes Q1, and stores (a1, b4) by using a cloud storage cluster in a compression unit format. When executing Q2, the computing node 1 determines, by querying a local index, that a1 is duplicated, and returns a check failure notification message to the coordinator node. For the computing node 2, the computing node 2 executes Q3 and Q4, and determines, by querying a local index, that a1 and a2 meet the constraint condition. Then, the computing node 1 and the computing node 2 send a check request to each metadata node in a metadata cluster, where the check request carries an identifier of a compression unit. Each metadata node in the metadata cluster obtains data (a1, b1), (a1, b2), and (a2, b2) from the cloud storage cluster based on the check request, and redistributes the data based on the field a, and adds a field value corresponding to the field a to a sub global index of each metadata node. In other words, sub global indexes of a metadata node 1 include (a1, b1) and (a1, b2). Based on this, the metadata node 1 checks that a1 is duplicated, and compares timestamps of (a1, b1) and (a1, b2) according to a target rule. Data with a smaller timestamp is successfully inserted, data with a larger timestamp fails to be inserted, and a processing result is returned to the coordinator node. Further, a clean task for the duplicated data (namely, the data that fails to be inserted) is triggered, in other words, the duplicated data in the cloud storage cluster is marked as to-be-cleaned data.

In conclusion, in the data warehouse system-based data processing method provided in this embodiment of this disclosure, the coordinator node allocates the data write request of the data table to a first computing node in the cloud computing cluster, and the first computing node checks whether target data corresponding to the data write request meets the constraint condition. If the check succeeds, the metadata cluster checks the target data again. If the check performed by the metadata cluster also succeeds, the cloud storage cluster writes the target data into the data table. It can be learned that the data warehouse system uses a two-layer indexing mechanism and the metadata cluster of a cloud native architecture to check whether data to be written into the data table meets the constraint condition. Therefore, when a data constraint capability is provided, data reliability is ensured, and that system running performance is not affected is also ensured.

Based on the content shown in FIG. 5 to FIG. 8, two processing manners of the data warehouse system provided in embodiments of this disclosure are described. The following summarizes the foregoing content with reference to FIG. 9 and the data warehouse system shown in FIG. 1.

Figure 9:
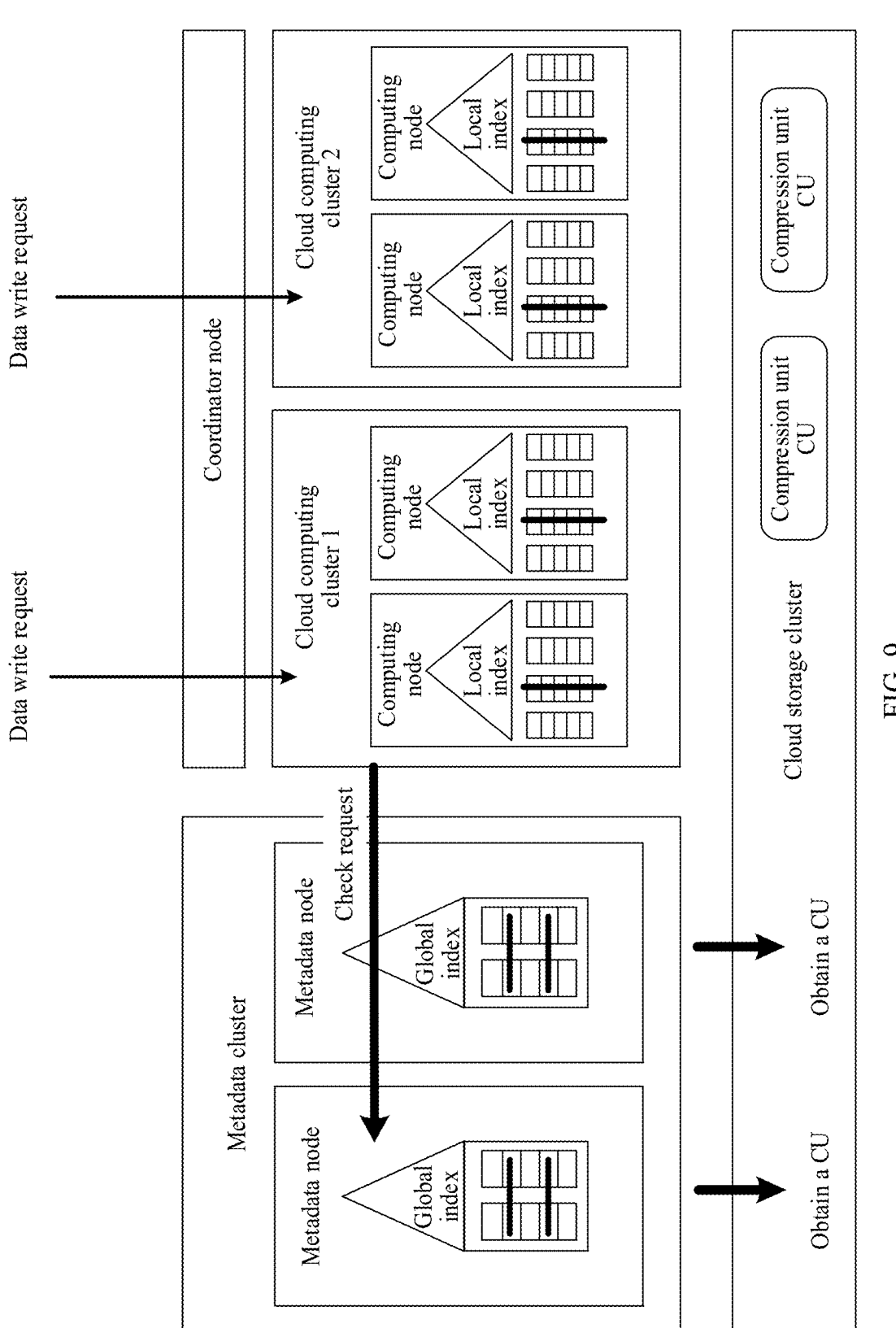
FIG. 9 is a diagram of a data warehouse system according to an embodiment of this disclosure.

FIG. 9 is a diagram of a data warehouse system according to an embodiment of this disclosure. As shown in FIG. 9, a coordinator node receives a data write request of a data table. In some embodiments, the data write request carries a target identifier, the target identifier indicates a check manner of the data warehouse system, and the check manner includes real-time check and asynchronous delayed check. In this manner, a cloud computing cluster determines a subsequent execution procedure, in other words, a user may determine a check manner to be used, to meet a personalized requirement of the user. Certainly, in some other embodiments, the coordinator node can independently determine a check manner based on a quantity of data write requests received in a target time period (which can be set based on an actual application), and notify the cloud computing cluster, to implement a check process that a user is unaware of, and improve running efficiency of the data warehouse system. This is not limited in this embodiment of this disclosure. Further, the coordinator node allocates the data write request to each computing node in the cloud computing cluster, and each computing node checks a field value of a constraint field in received data based on a local index. If the check succeeds, the computing node sends a check request to a metadata cluster, and the metadata cluster performs check again based on a global index. If the check succeeds, a cloud storage cluster writes target data into the data table.

It can be learned that the data warehouse system provided in this embodiment of this disclosure uses a two-layer indexing mechanism and the metadata cluster of a cloud native architecture to check whether data to be written into the data table meets a constraint condition. Therefore, when a data constraint capability is provided, data reliability is ensured, and that system running performance is not affected is also ensured. In addition, this manner supports seamless and smooth import of a TP-type data source with a primary key constraint into the data warehouse system. This is beneficial to scalability of the data warehouse system. Further, a unique constraint is used as an example. When defining the data table, the user can implement the unique constraint without binding a unique constraint field to a partition field, thereby ensuring the running performance of the data warehouse system and reducing total costs.

In addition, based on the foregoing descriptions of the data warehouse system 100, it can be learned that the data warehouse system 100 may also be understood as being formed by various apparatuses. For example, the coordinator node may be referred to as a coordinator apparatus. All the apparatuses may be implemented by using software or hardware. Based on the foregoing method embodiments, the following describes functions of the apparatuses in the data warehouse system 100.

Figure 10:
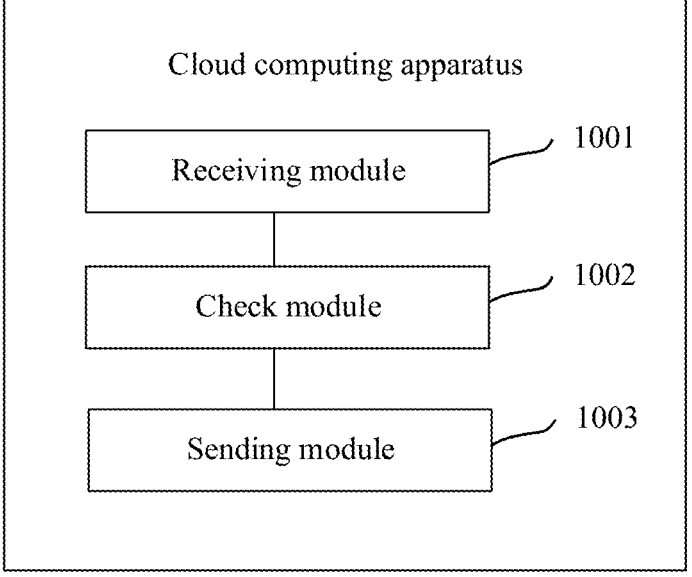
FIG. 10 is a diagram of a structure of a cloud computing apparatus according to an embodiment of this disclosure.

FIG. 10 is a diagram of a structure of a cloud computing apparatus according to an embodiment of this disclosure. The cloud computing apparatus may implement some or all functions of the cloud computing cluster in the foregoing data warehouse system by using software, hardware, or a combination thereof. As shown in FIG. 10, the cloud computing apparatus is used in the data warehouse system. The data warehouse system includes a coordinator node, a metadata cluster, a cloud computing cluster, and a cloud storage cluster. The cloud computing apparatus includes a receiving module 1001, a check module 1002, and a sending module 1003.

The receiving module 1001 is configured to receive a data write request that is of a data table and that is sent by the coordinator node in the data warehouse system;

The check module 1002 is configured to check, in response to the data write request based on a local index of a first computing node, whether a field value of a constraint field in target data to be written into the data table meets a constraint condition corresponding to the constraint field, where the local index includes a field value of a constraint field in data corresponding to a data write request previously received by the first computing node, and the first computing node is configured to process data in a partition to which the target data belongs in the data table;

The sending module 1003 is configured to: send a check request for the target data to the metadata cluster in the data warehouse system if the check performed by the first computing node on the target data succeeds; or write the target data into the data table by using the cloud storage cluster if the check performed by the metadata cluster on the target data succeeds.

In some embodiments, the constraint condition is any one of the following: a unique constraint, a primary key constraint, and a foreign key constraint.

In some embodiments, the constraint condition is the unique constraint. The check module 1002 is configured to: query the local index in response to the data write request based on the field value of the constraint field in the target data, where the check on the target data succeeds if a field value that is the same as the field value of the constraint field in the target data does not exist in the local index.

In some embodiments, the constraint condition is the primary key constraint. The check module 1002 is configured to: query the local index in response to the data write request based on the field value of the constraint field in the target data, where the check on the target data succeeds if a field value that is the same as the field value of the constraint field in the target data does not exist in the local index, and the field value of the constraint field in the target data is not null.

In some embodiments, the constraint condition is the foreign key constraint. The check module 1002 is configured to: query the local index in response to the data write request based on the field value of the constraint field in the target data, where the check on the target data succeeds if a target field value that is the same as the field value of the constraint field in the target data exists in the local index, and the target field value belongs to an associated data table of the data table.

In some embodiments, the receiving module 1001 is further configured to: receive, if the check performed by the metadata cluster on the target data succeeds, a check success notification message sent by the metadata cluster. The sending module 1003 is further configured to send the target data to the cloud storage cluster based on the notification message, to enable the cloud storage cluster to write the target data into the data table.

In some embodiments, the sending module 1003 is configured to: send the target data to the cloud storage cluster if the check on the target data succeeds, to enable the cloud storage cluster to write the target data into the data table; and send a check request for a plurality of pieces of data to the metadata cluster if a quantity of the plurality of pieces of data sent to the cloud storage cluster reaches a target threshold, where the plurality of pieces of data include the target data.

In some embodiments, the sending module 1003 is configured to: send the target data to the cloud storage cluster if the check on the target data succeeds, to enable the cloud storage cluster to compress the plurality of pieces of data including the target data into a compression unit and write the compression unit into the data table; and send the check request for the plurality of pieces of data to the metadata cluster based on an identifier of the compression unit if the quantity of the plurality of pieces of data sent to the cloud storage cluster reaches the target threshold.

It should be noted that, when the cloud computing apparatus provided in the foregoing embodiment performs data processing, division of the foregoing functional modules is merely used as an example for description. During actual application, the foregoing functions may be allocated to different functional modules for implementation based on a requirement. In other words, an internal structure of the apparatus is divided into different functional modules to implement all or some of the foregoing described functions. In addition, the cloud computing apparatus provided in the foregoing embodiment and the foregoing method embodiment belong to a same concept. For a implementation process of the cloud computing apparatus, refer to the method embodiment. Details are not described herein again.

Figure 11:
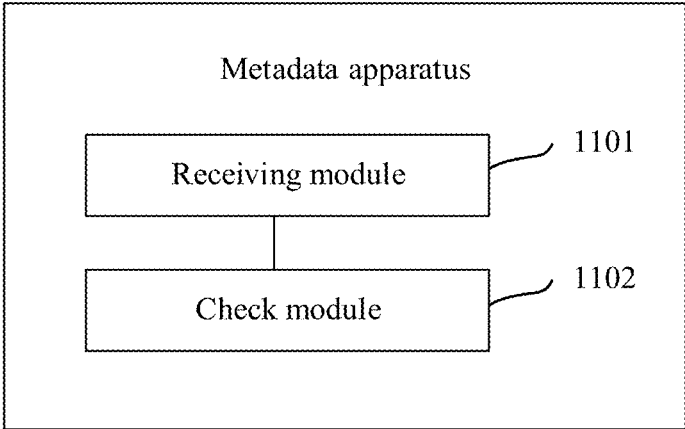
FIG. 11 is a diagram of a structure of a metadata apparatus according to an embodiment of this disclosure.

FIG. 11 is a diagram of a structure of a metadata apparatus according to an embodiment of this disclosure. The metadata apparatus may implement some or all functions of the cloud computing cluster in the foregoing data warehouse system by using software, hardware, or a combination thereof. As shown in FIG. 11, the metadata apparatus is used in the data warehouse system. The data warehouse system includes a coordinator node, a metadata cluster, a cloud computing cluster, and a cloud storage cluster. The metadata apparatus includes a receiving module 1101 and a check module 1102.

The receiving module 1101 is configured to receive a check request that is for target data and that is sent by a first computing node in the cloud computing cluster, where the first computing node is configured to process data in a partition to which the target data belongs in a data table, and the check request is sent when the first computing node checks, based on a local index of the first computing node in response to a data write request that is of the data table and that is sent by the coordinator node, whether a field value of a constraint field in the target data to be written into the data table meets a constraint condition corresponding to the constraint field. The local index includes a field value of a constraint field in data corresponding to a data write request previously received by the first computing node.

The check module 1102 is configured to check, in response to the check request based on a global index of the metadata cluster, whether the field value of the constraint field in the target data meets the constraint condition, where the global index includes a field value of a constraint field in data corresponding to a data write request previously received by the cloud computing cluster.

In some embodiments, the constraint condition is any one of the following: a unique constraint, a primary key constraint, and a foreign key constraint.

In some embodiments, the constraint condition is the unique constraint. The check module 1102 is configured to query the global index in response to the check request based on the field value of the constraint field in the target data, where the check on the target data succeeds if a field value that is the same as the field value of the constraint field in the target data does not exist in the global index.

In some embodiments, the constraint condition is the primary key constraint. The check module 1102 is configured to query the global index in response to the check request based on the field value of the constraint field in the target data, where the check on the target data succeeds if a field value that is the same as the field value of the constraint field in the target data does not exist in the global index, and the field value of the constraint field in the target data is not null.

In some embodiments, the constraint condition is the foreign key constraint. The check module 1102 is configured to query the global index in response to the check request based on the field value of the constraint field in the target data, where the check on the target data succeeds if a target field value that is the same as the field value of the constraint field in the target data exists in the global index, and the target field value belongs to an associated data table of the data table.

In some embodiments, the global index is divided into a plurality of sub global indexes based on the field value of the constraint field, the sub global indexes are respectively stored on metadata nodes in the metadata cluster, and field values of constraint fields in the sub global indexes are different from each other. The check module 1102 is configured to check, in response to the check request based on a sub global index corresponding to each metadata node, whether the field value of the constraint field in the target data meets the constraint condition.

In some embodiments, the check module 1102 is configured to: obtain a plurality of pieces of data from the cloud storage cluster in response to a check request for the plurality of pieces of data; add field values of constraint fields in the plurality of pieces of data to the global index; and check, based on a global index obtained through addition, whether the plurality of pieces of data meet the constraint condition.

In some embodiments, the apparatus further includes a mark module, where the mark module is configured to mark the target data in the cloud storage cluster as to-be-cleaned data if the check on the target data fails.

It should be noted that, when the metadata apparatus provided in the foregoing embodiment performs data processing, division of the foregoing functional modules is merely used as an example for description. During actual application, the foregoing functions may be allocated to different functional modules for implementation based on a requirement. In other words, an internal structure of the apparatus is divided into different functional modules to implement all or some of the foregoing described functions. In addition, the metadata apparatus provided in the foregoing embodiment and the foregoing method embodiment belong to a same concept. For a implementation process of the metadata apparatus, refer to the method embodiment. Details are not described herein.

Embodiments of this disclosure further provide a computer program product including instructions. The computer program product may be software or a program product that includes instructions and that can run on a computing device or be stored in any usable medium. When the computer program product runs on at least one computing device, the at least one computing device is enabled to perform the foregoing data warehouse system-based data processing method.

Embodiments of this disclosure further provide a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a digital versatile disc (DVD)), a semiconductor medium (for example, an SSD), or the like. The computer-readable storage medium includes instructions, and the instructions are used to instruct the computing device to perform the foregoing data warehouse system-based data processing method.

Terms such as "first" and "second" in this disclosure are used to distinguish between same or similar items with basically same roles and functions. It should be understood that there is no logical or timing dependency between "first", "second", and "nth", and neither a quantity nor an execution sequence is limited. It should also be understood that although the following descriptions use terms such as "first" and "second" to describe various elements, these elements should not be limited by the terms. These terms are merely used to distinguish one element from another element. For example, without departing from the scope of the various examples, a first node may be referred to as a second node, and similarly, a second node may be referred to as a first node. Both the first node and the second node may be nodes, and may be separate and different nodes in some cases.

The term "at least one" in this disclosure means one or more, and the term "a plurality of" in this disclosure means two or more. For example, a plurality of nodes means two or more nodes.

The foregoing descriptions are merely implementations of this disclosure, but are not intended to limit the protection scope of this disclosure. Any equivalent modification or replacement readily figured out by persons skilled in the art within the technical scope disclosed in this disclosure shall fall within the protection scope of this disclosure. Therefore, the protection scope of this disclosure shall be subject to the protection scope of the claims.

All or some of the foregoing embodiments may be implemented by using software, hardware, firmware, or any combination thereof. When software is used to implement embodiments, all or some of embodiments may be implemented in a form of program structure information. The program structure information includes one or more program instructions. When the program instructions are loaded and executed on a computing device, the procedures or functions according to embodiments of this disclosure are all or partially generated.

Persons of ordinary skill in the art may understand that all or some of the steps of embodiments may be implemented by using hardware or by a program instructing related hardware. The program may be stored in a computer-readable storage medium. The storage medium may be a ROM, a magnetic disk, or an optical disc.

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

The invention claimed is:

1. A method, applied to a data warehouse system and comprising:

allocating, by a coordinator node of the data warehouse system in response to a first data write request of a data table, the first data write request to a first computing node in a cloud computing cluster of the data warehouse system based on a first field value of a partition field in target data to be written into the data table;

performing, by the first computing node, in response to the first data write request, and based on a local index of the first computing node, a first check of whether a second field value of a constraint field in the target data meets a constraint condition corresponding to the constraint field, wherein the local index comprises a third field value of a first constraint field in first data corresponding to a second data write request previously received by the first computing node;

sending, by the first computing node when the first check succeeds, a check request for the target data to a metadata cluster of the data warehouse system;

performing, by the metadata cluster, in response to the check request, and based on a global index of the metadata cluster, a second check of whether the second field value meets the constraint condition, wherein the global index comprises a fourth field value of a second constraint field in second data corresponding to a third data write request previously received by the cloud computing cluster; and writing, by a cloud storage cluster of the data warehouse system when the first check succeeds and the second check succeeds, the target data into the data table.

2. The method according to claim 1, wherein the constraint condition is one of: a unique constraint, a primary key constraint, or a foreign key constraint.

3. The method according to claim 2, wherein the constraint condition is the unique constraint, wherein performing the first check comprises querying, by the first computing node, the local index in response to the first data write request and based on the second field value, wherein the first check succeeds when another field value that is the same as the second field value does not exist in the local index, wherein performing the second check comprises querying, by the metadata cluster, the global index in response to the check request and based on the second field value, and wherein the second check succeeds when another field value that is the same as the second field value does not exist in the global index.

4. The method according to claim 2, wherein the constraint condition is the primary key constraint, wherein performing the first check comprises querying, by the first computing node, the local index in response to the first data write request and based on the second field value, wherein the first check succeeds when another field value that is the same as the second field value does not exist in the local index and when the second field value is not null, wherein performing the second check, comprises: querying, by the metadata cluster, the global index in response to the check request and based on the second field value, and wherein the second check succeeds when another field value that is the same as the second field value does not exist in the global index and when the second field value is not null.

5. The method according to claim 2, wherein the constraint condition is the foreign key constraint, wherein performing the first check comprises querying, by the first computing node, the local index in response to the first data write request and based on the second field value, wherein the first check succeeds when a target field value that is the same as the second field value exists in the local index and when the target field value belongs to an associated data table of the data table, wherein performing the second check comprises querying, by the metadata cluster, the global index in response to the check request and based on the second field value, and wherein the second check succeeds when the target field value that is the same as the second field value exists in the global index and when the target field value belongs to the associated data table of the data table.

6. The method according to claim 1, wherein the global index is divided into a plurality of sub global indexes based on the fourth field value, wherein the sub global indexes are respectively stored on metadata nodes in the metadata cluster, wherein field values of constraint fields in the sub global indexes are different from each other, and wherein performing the second check comprises checking, by each of the metadata nodes, in response to the check request, and based on one of the plurality of sub global indexes corresponding to each of the metadata nodes, whether the second field value meets the constraint condition.

7. The method according to claim 1, further comprising: returning, by the metadata cluster, a check success notification message to the first computing node when the second check succeeds; and sending, by the first computing node, the target data to the cloud storage cluster based on the check success notification message in order to enable the cloud storage cluster to write the target data into the data table.

8. The method according to claim 1, wherein sending, when the second field value meets the constraint condition, the check request for the target data to the metadata cluster comprises:

sending the target data to the cloud storage cluster when the first check succeeds in order to enable the cloud storage cluster to write the target data into the data table; and sending the check request for a plurality of pieces of data to the metadata cluster when a quantity of the plurality of pieces of data communicated from the first computing node to the cloud storage cluster reaches a target threshold, wherein the plurality of pieces of data comprise the target data.

9. The method according to claim 8, wherein performing the second check comprises:

obtaining the plurality of pieces of data from the cloud storage cluster in response to the check request for the plurality of pieces of data;

adding field values of constraint fields in the plurality of pieces of data to the global index; and checking, based on the global index obtained through addition, whether the plurality of pieces of data meet the constraint condition.

10. The method according to claim 9, wherein performing the second checking further comprises:

obtaining, by a first metadata node in the metadata cluster, at least one piece of third data and the target data from the cloud storage cluster in response to the check request for the plurality of pieces of data and based on the field values of the constraint fields in the plurality of pieces of data;

adding, by the first metadata node, a fifth field value of a constraint field in the at least one piece of third data and the second field value to a sub global index corresponding to the first metadata node to obtain an updated sub global index; and checking, by the first metadata node based on the updated sub global index, whether the second field value meets the constraint condition.

11. A data warehouse system comprising:

a cloud computing cluster comprising a first computing node;

a metadata cluster;

a coordinator node configured to allocate, in response to a first data write request of a data table, the first data write request to the first computing node based on a first field value of a partition field in target data to be written into the data table, wherein the first computing node is configured to process data in a partition to which the target data belongs in the data table, wherein the first computing node is configured to:

perform, in response to the first data write request and based on a local index of the first computing node, a first check of whether a second field value of a constraint field in the target data meets a constraint condition corresponding to the constraint field, wherein the local index comprises a third field value of a first constraint field in first data corresponding to a second data write request previously received by the first computing node; and send, when the first check succeeds, a check request for the target data to the metadata cluster, wherein the metadata cluster is configured to perform, in response to the check request and based on a global index of the metadata cluster, a second check of whether the second field value meets the constraint condition, wherein the global index comprises a fourth field value of a second constraint field in second data corresponding to a third data write request previously received by the cloud computing cluster; and a cloud storage cluster configured to write, when the first check succeeds and the second check succeeds, the target data into the data table.

12. The data warehouse system according to claim 11, wherein the constraint condition is one of: a unique constraint, a primary key constraint, or a foreign key constraint.

13. The data warehouse system according to claim 12, wherein the constraint condition is the unique constraint, wherein the first computing node is configured to perform the first check by querying the local index in response to the first data write request and based on the second field value, wherein the first check succeeds when another field value that is the same as the second field value does not exist in the local index, wherein the metadata cluster is configured to perform the second check by querying the global index in response to the check request and based on the second field value, and wherein the second check succeeds when another field value that is the same as the second field value does not exist in the global index.

14. The data warehouse system according to claim 12, wherein the constraint condition is the primary key constraint, wherein the first computing node is configured to perform the first check by querying the local index in response to the first data write request and based on the second field value, wherein the first check succeeds when another field value that is the same as the second field value does not exist in the local index and when the second field value is not null, wherein the metadata cluster is configured to perform the second check by querying the global index in response to the check request and based on the second field value, and wherein the second check succeeds when another field value that is the same as the second field value does not exist in the global index and when the second field value is not null.

15. The data warehouse system according to claim 12, wherein the constraint condition is the foreign key constraint, wherein the first computing node is configured to perform the first check by querying the local index in response to the first data write request and based on the second field value, wherein the first check succeeds when a target field value that is the same as the second field value exists in the local index and when the target field value belongs to an associated data table of the data table, wherein the metadata cluster is configured to perform the second check by querying the global index in response to the check request and based on the second field value, and wherein the second check succeeds when the target field value that is the same as the second field value exists in the global index and when the target field value belongs to the associated data table of the data table.

16. The data warehouse system according to claim 11, wherein the global index is divided into a plurality of sub global indexes based on the fourth field value, wherein the sub global indexes are respectively stored on metadata nodes in the metadata cluster, wherein field values of constraint fields in the sub global indexes are different from each other, and wherein the metadata cluster is configured to perform the second check by checking, by each of the metadata nodes, in response to the check request, and based on one of the plurality of sub global indexes corresponding to each of the metadata nodes, whether the second field value meets the constraint condition.

17. The data warehouse system according to claim 11, wherein the metadata cluster is further configured to return a check success notification message to the first computing node when the second check on the target data succeeds, and wherein the first computing node is further configured to send the target data to the cloud storage cluster based on the check success notification message in order to enable the cloud storage cluster to write the target data into the data table.

18. The data warehouse system according to claim 11, wherein the first computing node is further configured to send the check request for the target data to the metadata cluster by:

sending the target data to the cloud storage cluster when the first check succeeds in order to enable the cloud storage cluster to write the target data into the data table; and sending the check request for a plurality of pieces of data to the metadata cluster when a quantity of the plurality of pieces of data communicated from the first computing node to the cloud storage cluster reaches a target threshold, wherein the plurality of pieces of data comprise the target data.

19. The data warehouse system according to claim 18, wherein the metadata cluster is configured to perform the second check by:

obtaining the plurality of pieces of data from the cloud storage cluster in response to the check request for the plurality of pieces of data;

adding field values of constraint fields in the plurality of pieces of data to the global index; and checking, based on the global index obtained through addition, whether the plurality of pieces of data meet the constraint condition.

20. The data warehouse system according to claim 19, wherein the metadata cluster is configured to perform the second check by configuring a first metadata node in the metadata cluster to:

obtain at least one piece of third data and the target data from the cloud storage cluster in response to the check request for the plurality of pieces of data and based on the field values of the constraint fields in the plurality of pieces of data;

add a fifth field value of a constraint field in the at least one piece of third data and the second field value to a sub global index corresponding to the first metadata node to obtain an updated sub global index; and check, based on the updated sub global index, whether the second field value meets the constraint condition.

* * * * *